Feb. 2, 1960     N. R. FRIEBERG ET AL     2,923,394
CALCULATING MACHINES

Original Filed Feb. 24, 1954     19 Sheets-Sheet 1

INVENTORS
NELSON R. FRIEBERG
& OSCAR F. LARSEN

THEIR ATTORNEYS

Feb. 2, 1960  N. R. FRIEBERG ET AL  2,923,394
CALCULATING MACHINES
Original Filed Feb. 24, 1954  19 Sheets-Sheet 6

INVENTORS
NELSON R. FRIEBERG
& OSCAR F. LARSEN
BY
THEIR ATTORNEYS

Feb. 2, 1960 N. R. FRIEBERG ET AL 2,923,394
CALCULATING MACHINES
Original Filed Feb. 24, 1954 19 Sheets-Sheet 7
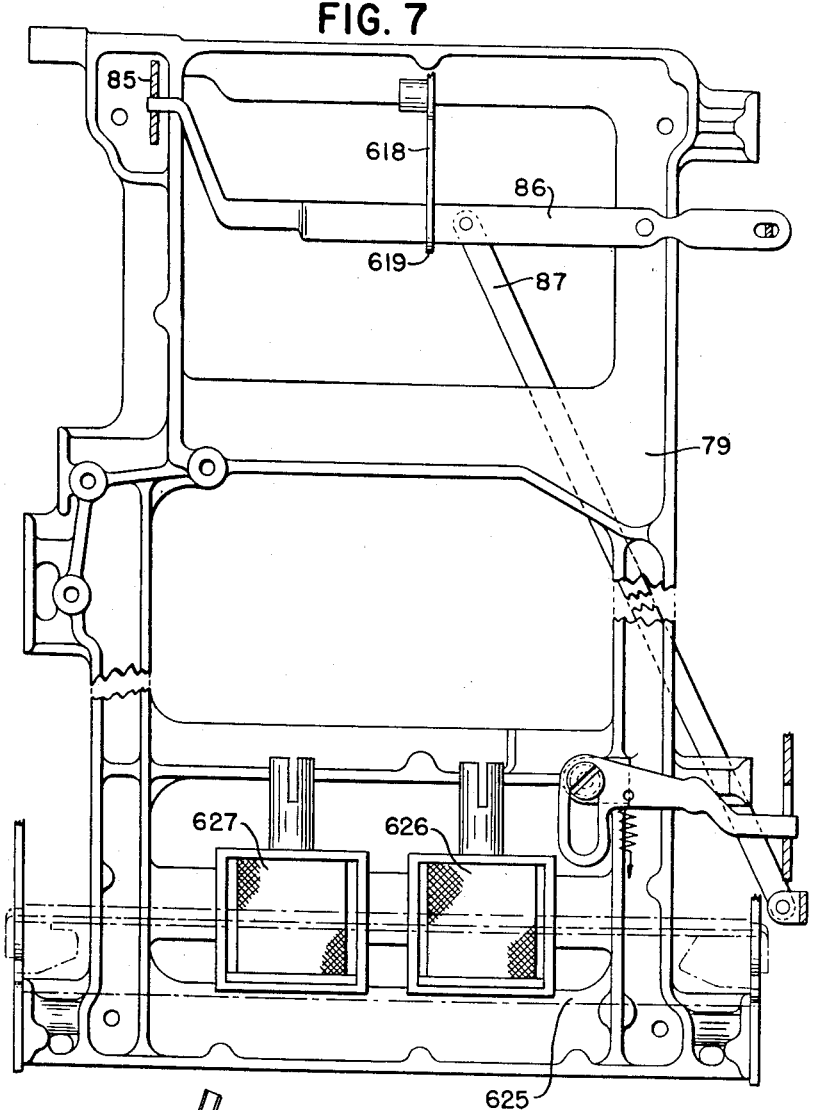
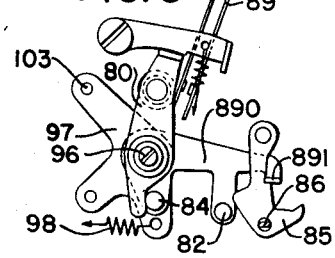
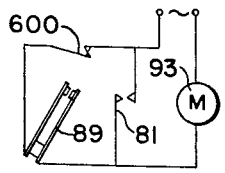
INVENTORS
NELSON R. FRIEBERG
& OSCAR F. LARSEN
BY *Louis A. Kline*
*Justin S. Compton*
THEIR ATTORNEYS

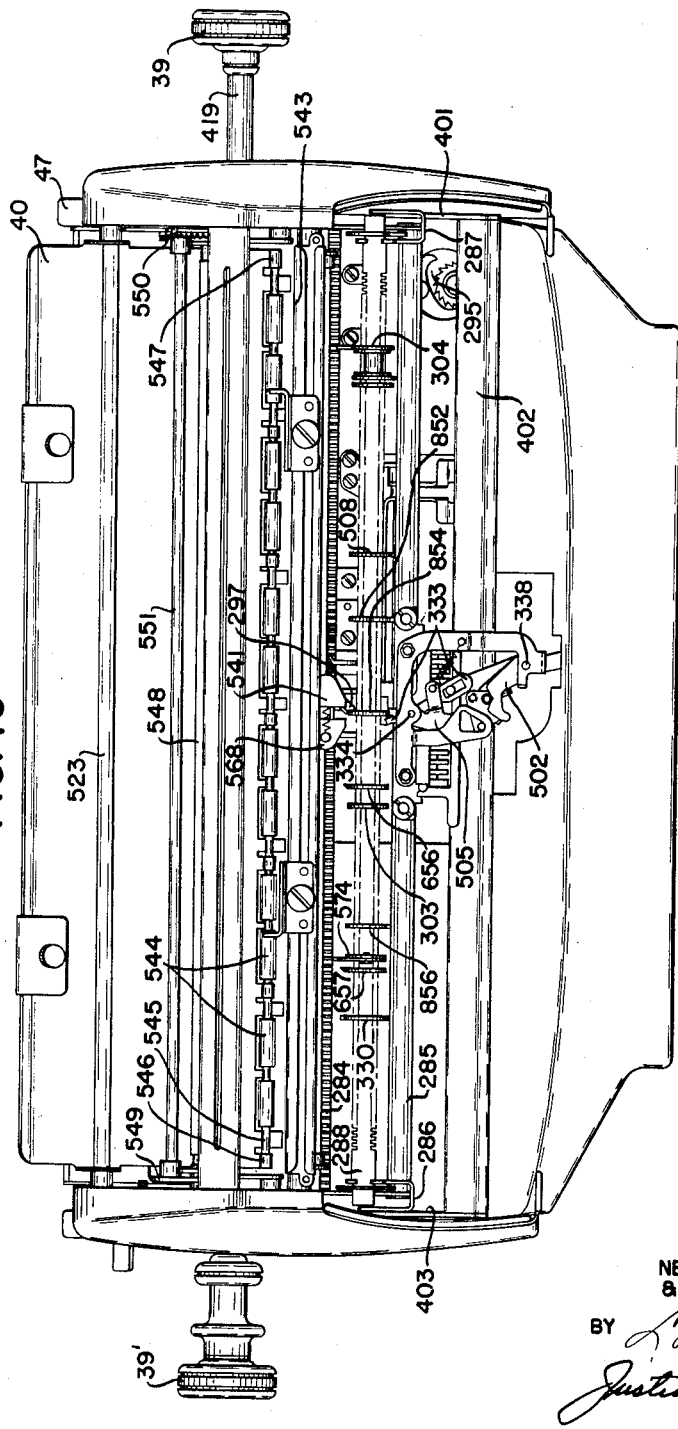

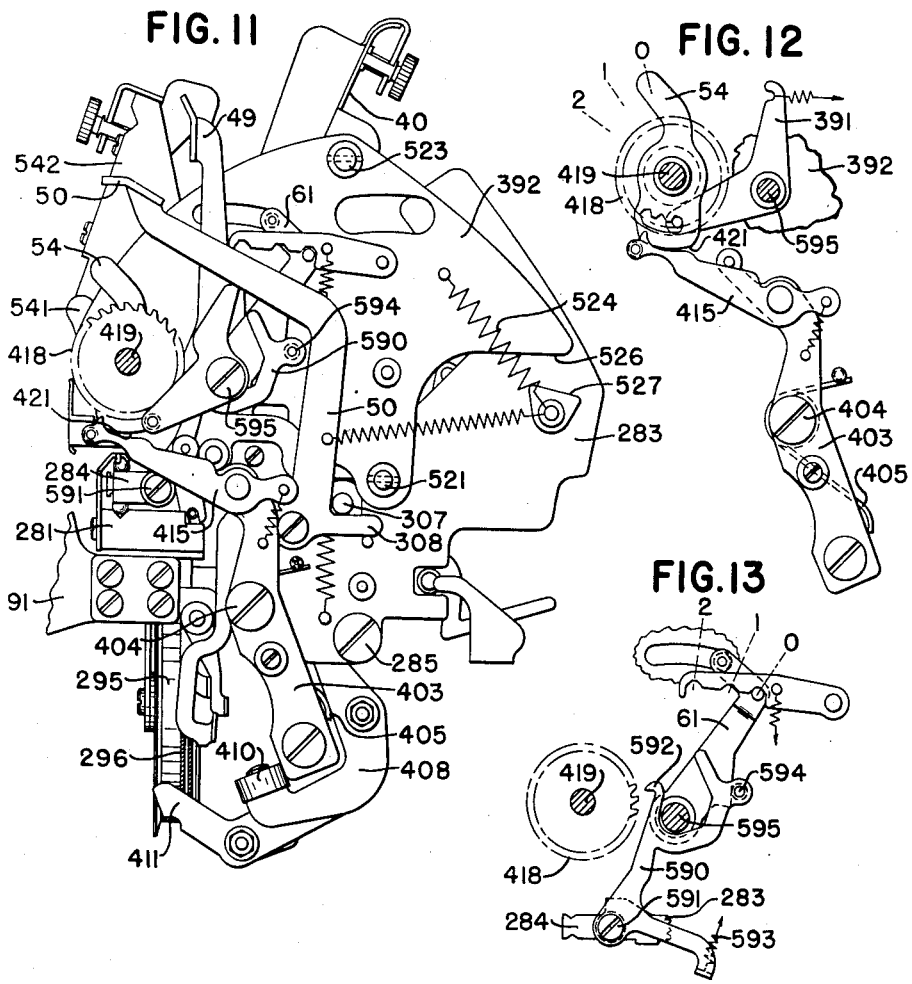

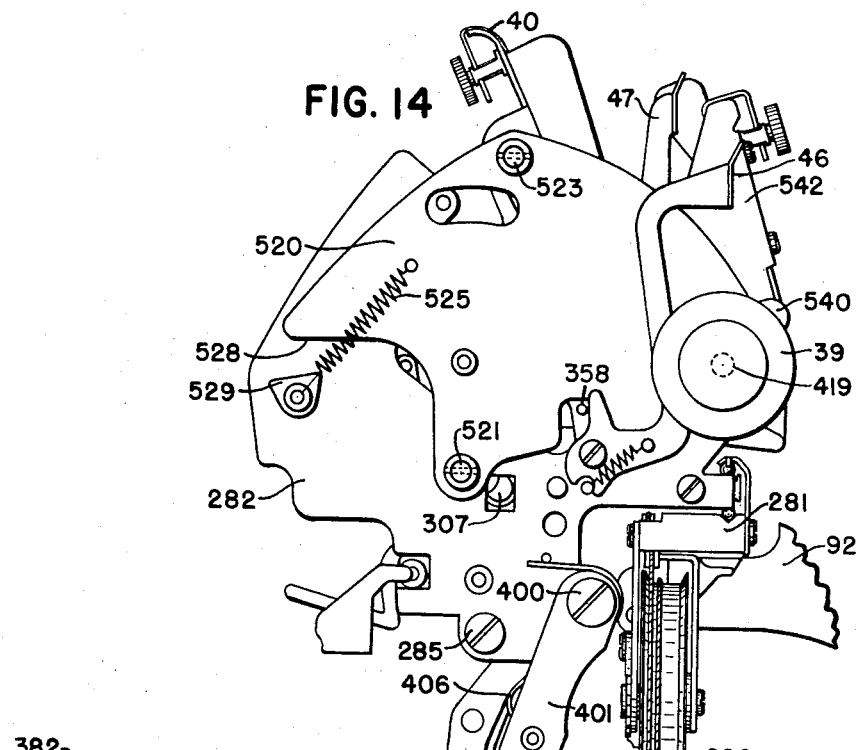
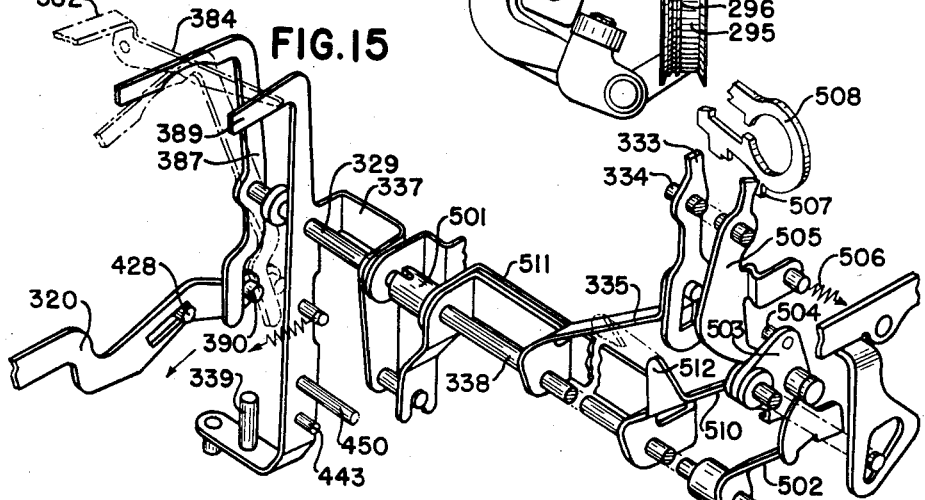

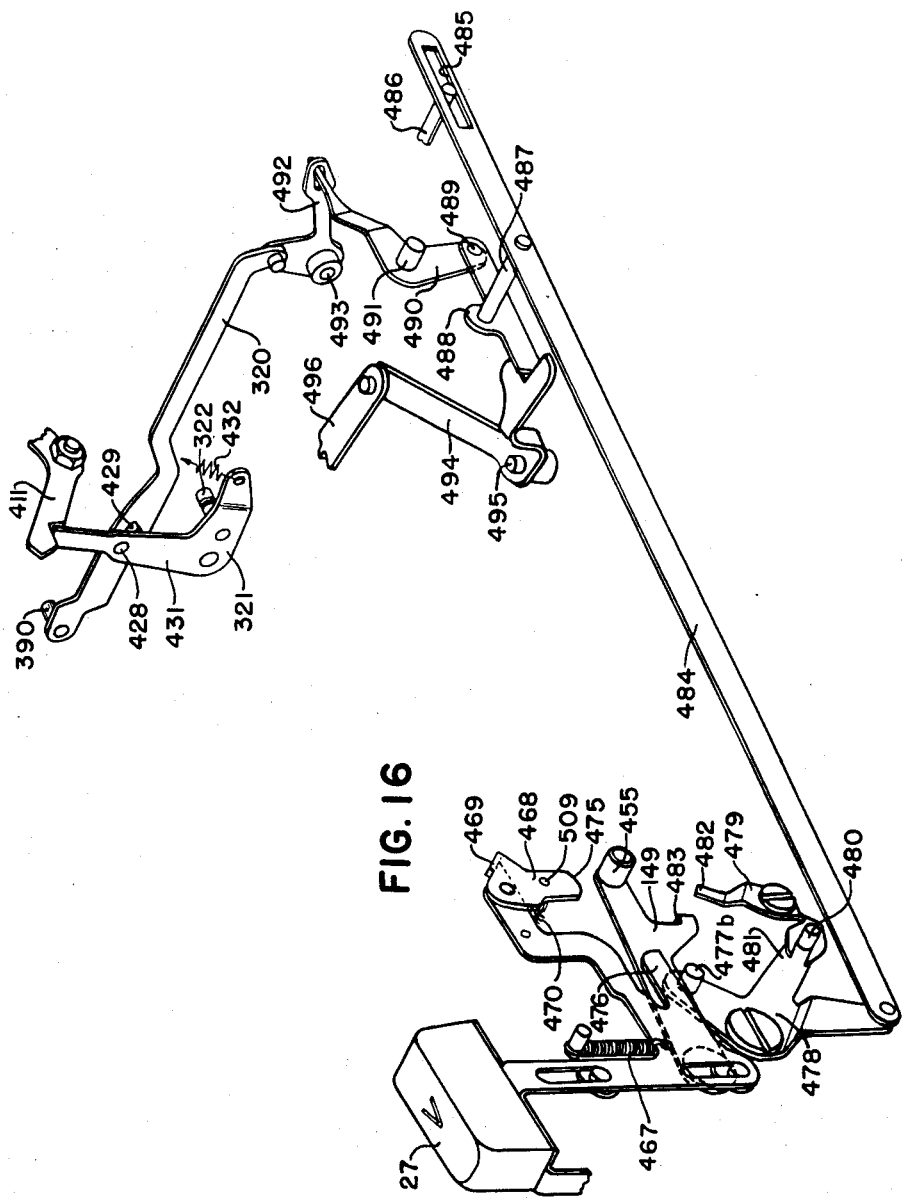

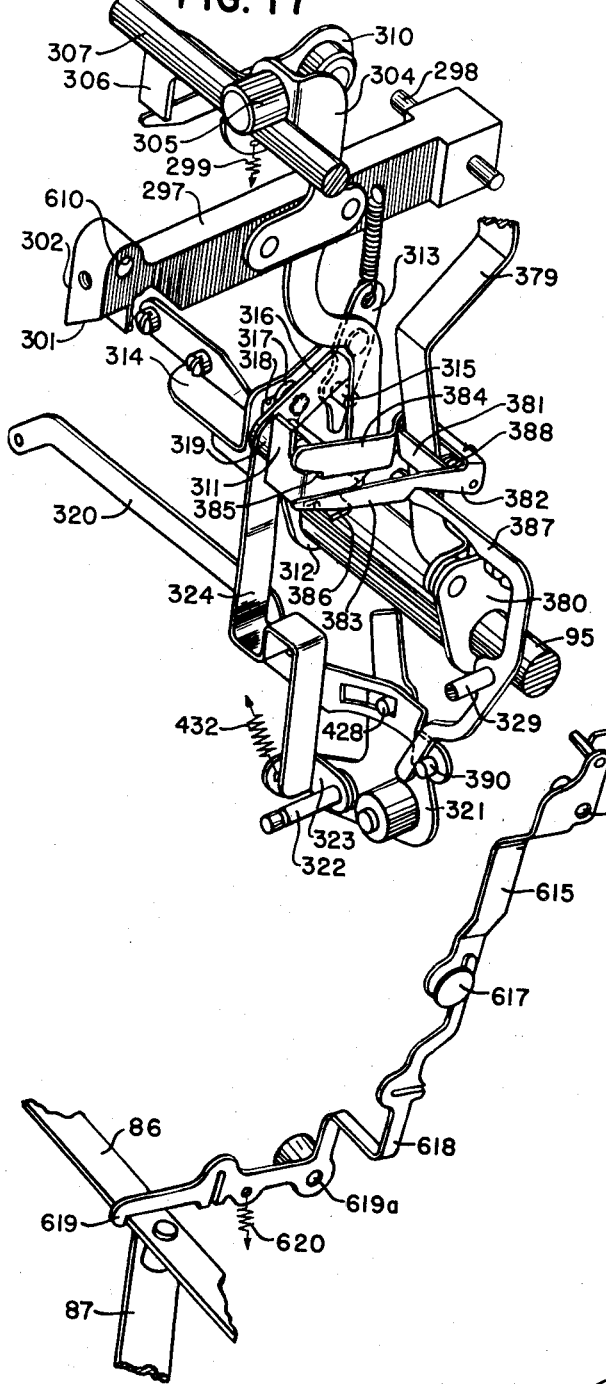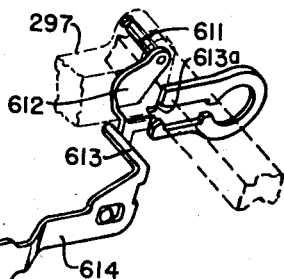

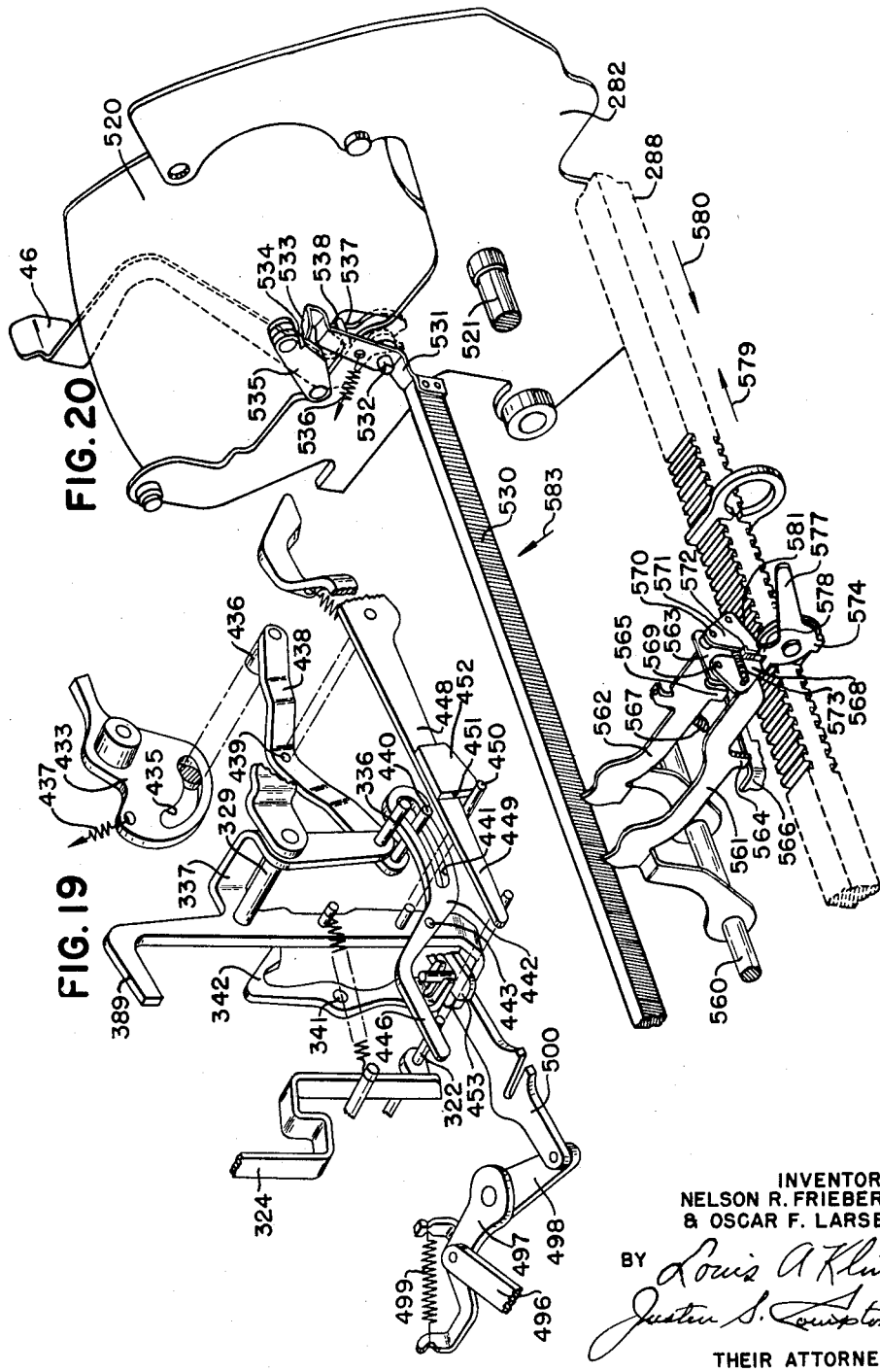

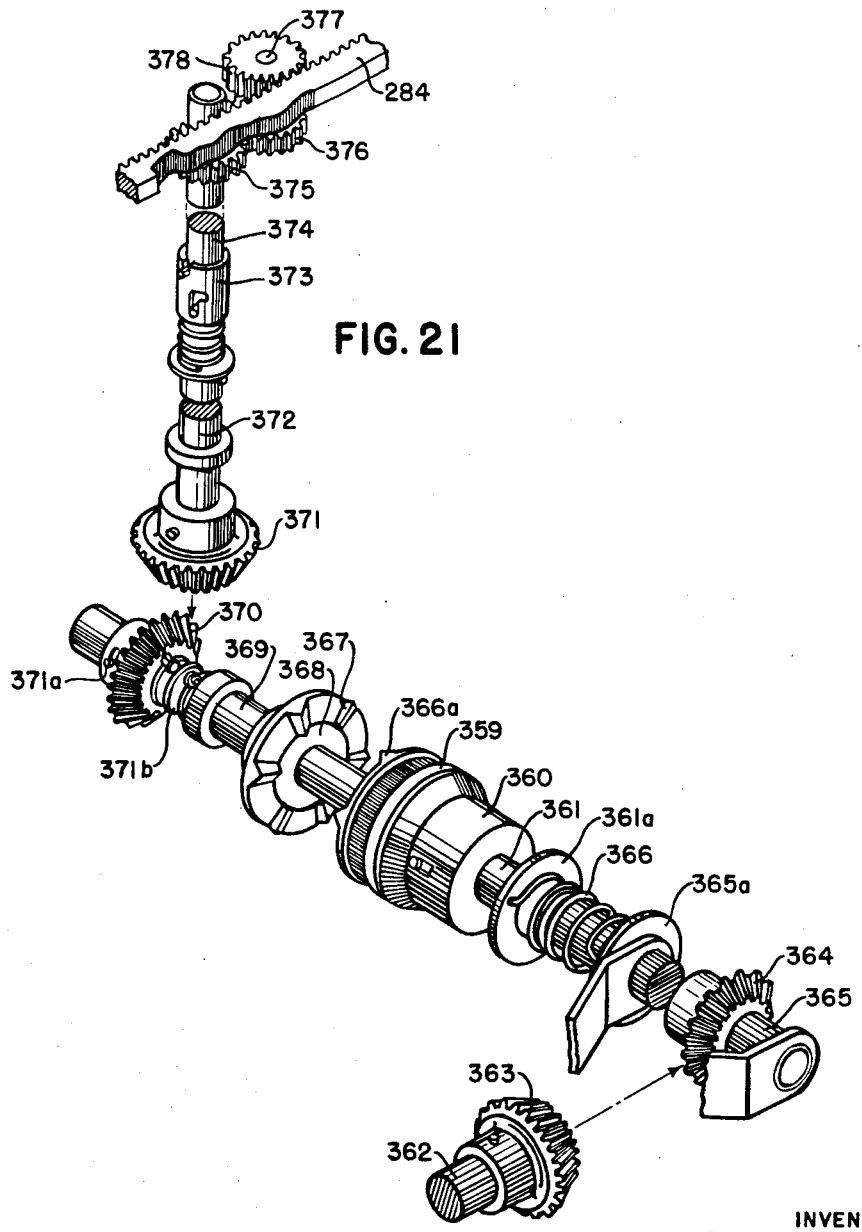

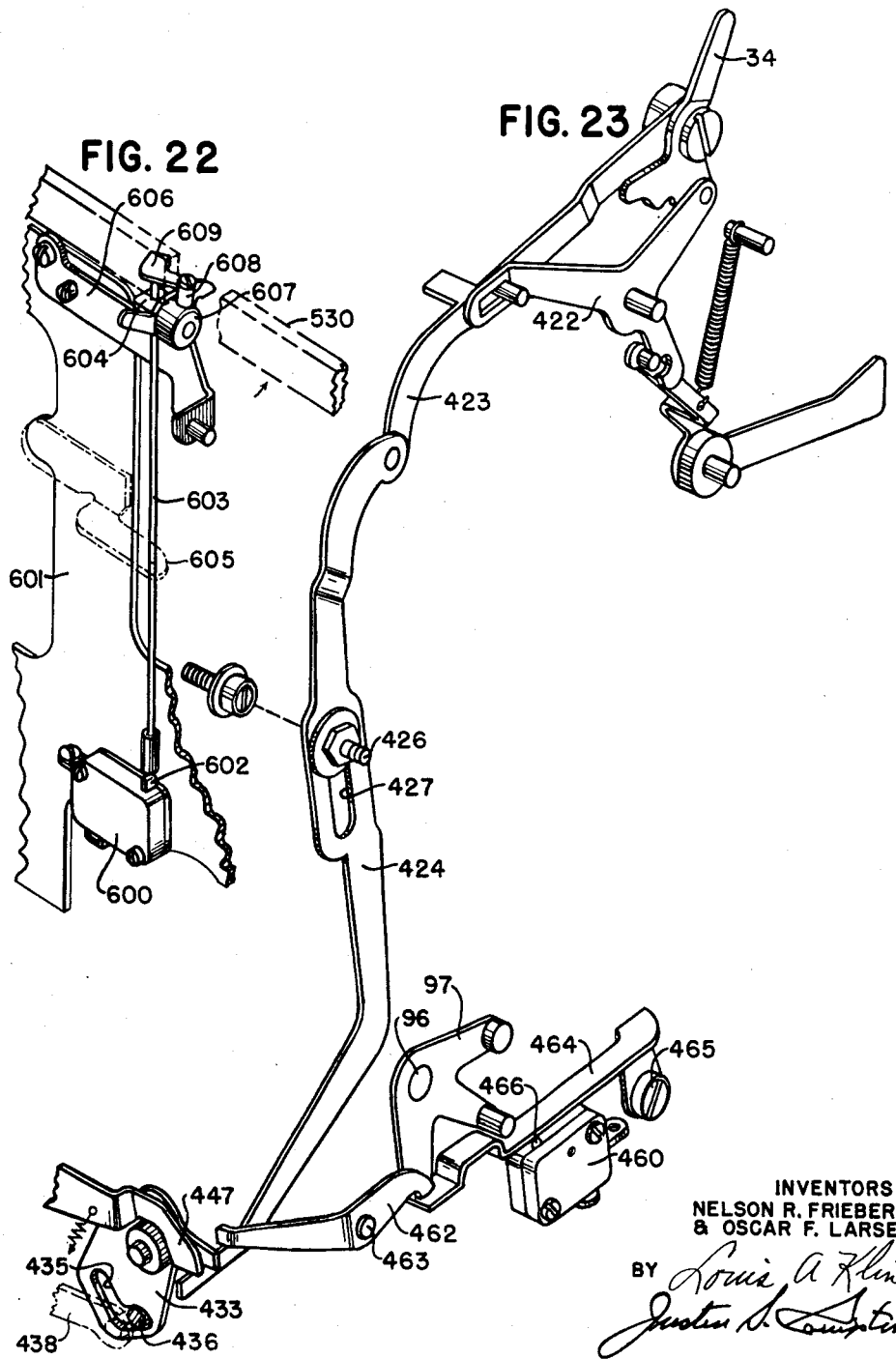

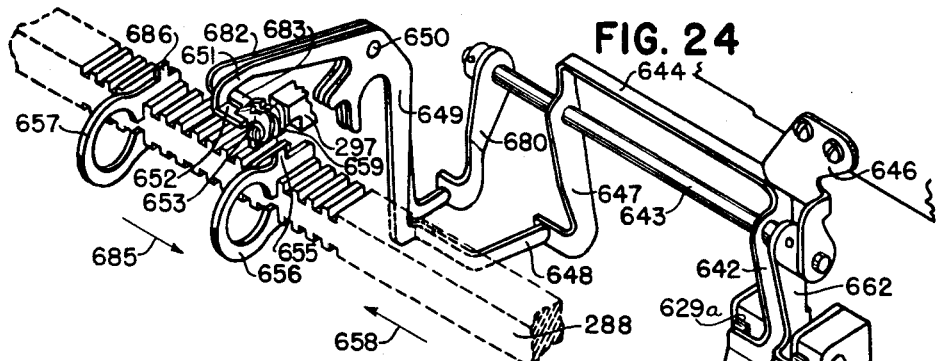
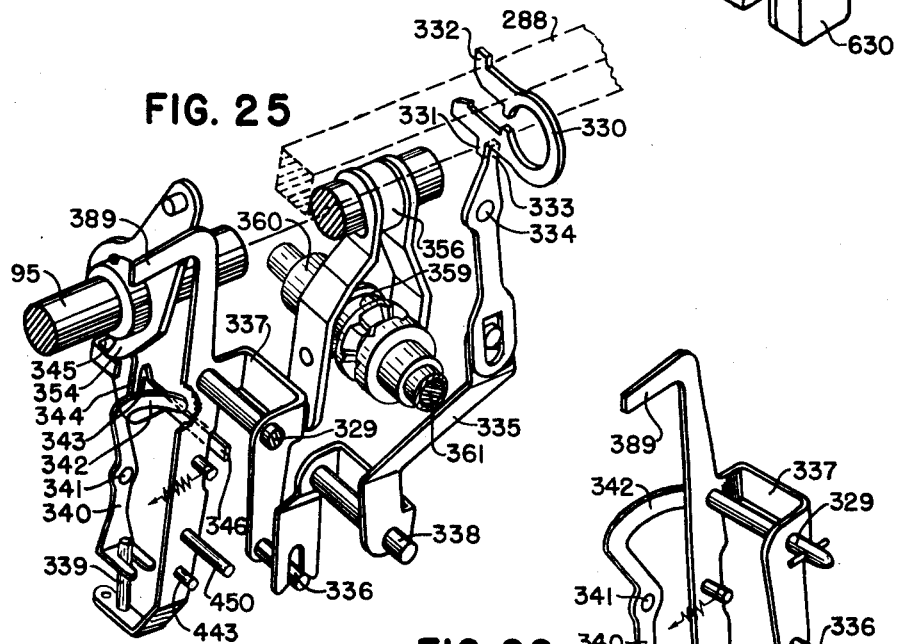
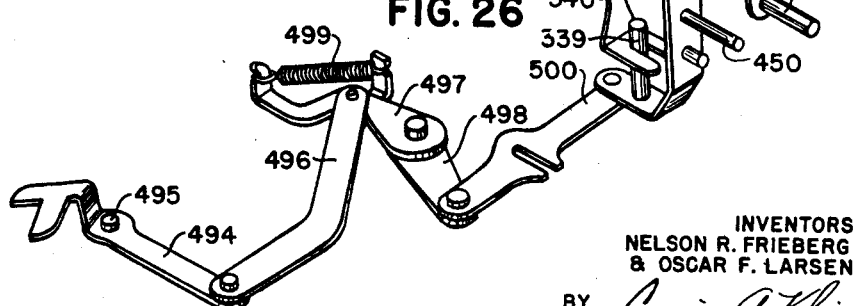
INVENTORS
NELSON R. FRIEBERG
& OSCAR F. LARSEN
BY Louis A Kline
Justin S. Compton
THEIR ATTORNEYS

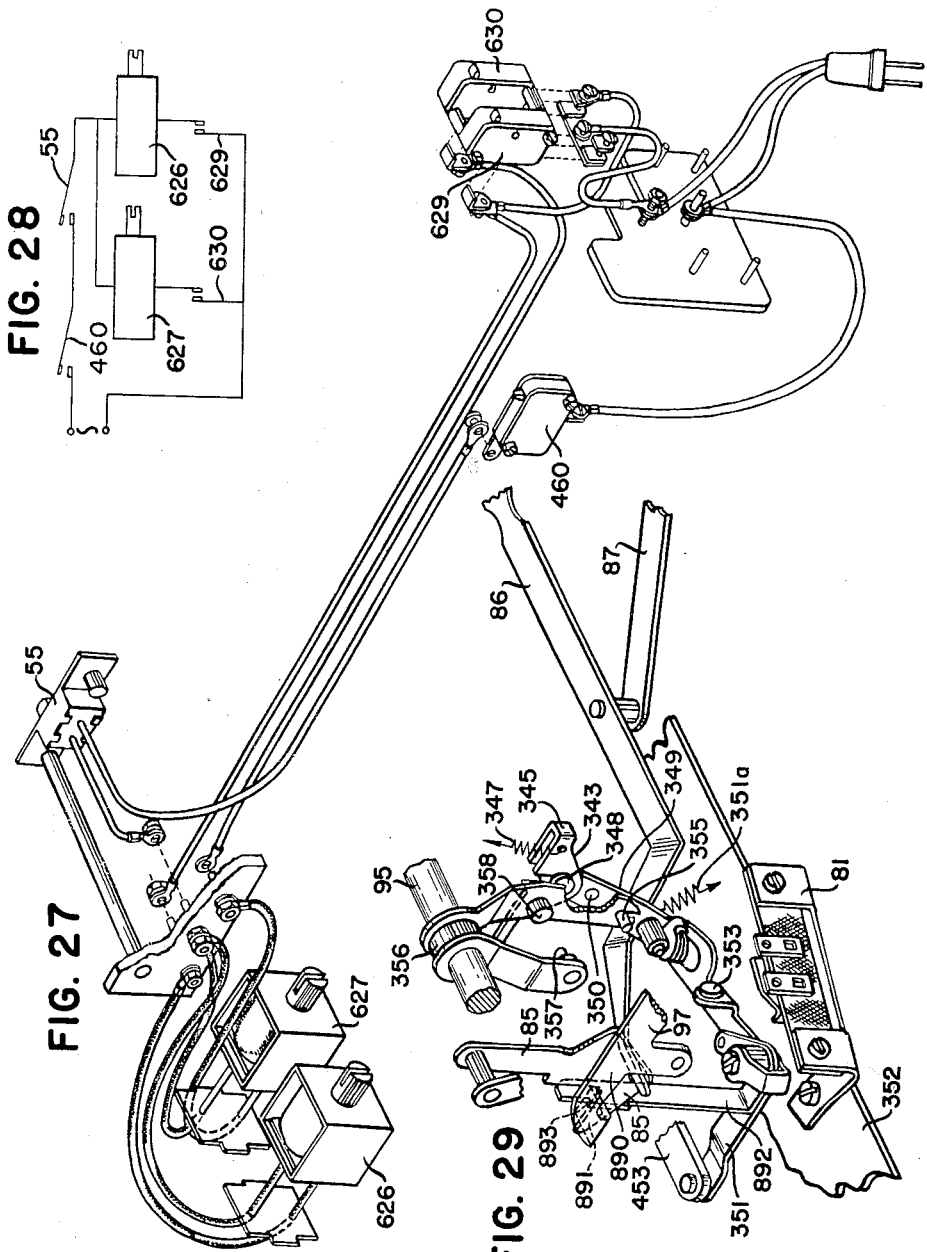

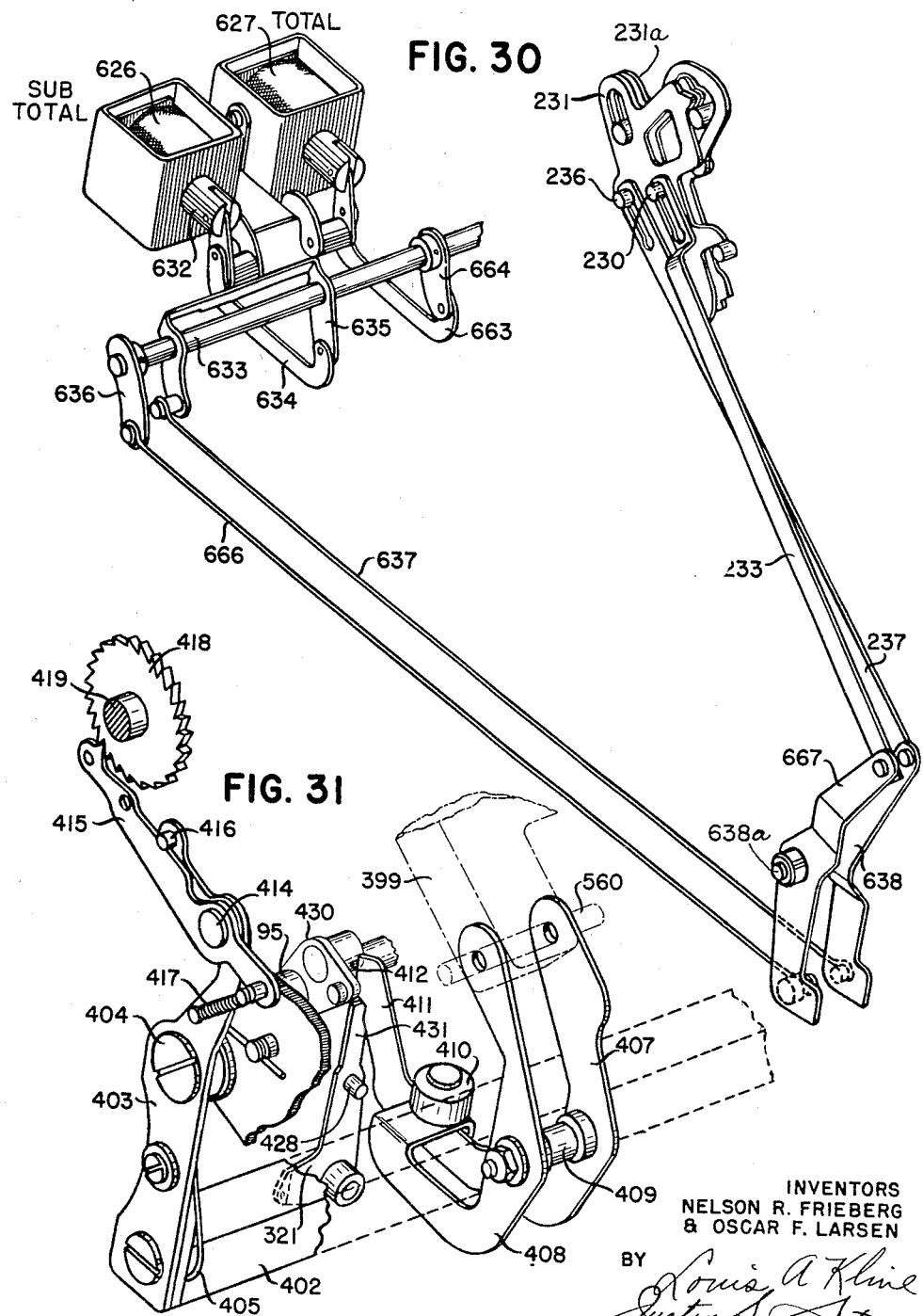

Feb. 2, 1960 N. R. FRIEBERG ET AL 2,923,394
CALCULATING MACHINES
Original Filed Feb. 24, 1954 19 Sheets-Sheet 19

INVENTORS
NELSON R. FRIEBERG
& OSCAR F. LARSEN
BY
THEIR ATTORNEYS

United States Patent Office

2,923,394
Patented Feb. 2, 1960

2,923,394

CALCULATING MACHINES

Nelson R. Frieberg and Oscar F. Larsen, Ithaca, N.Y., assignors to The National Cash Register Company, Dayton, Ohio, a corporation of Maryland Original application February 24, 1954, Serial No. 412,302, now Patent No. 2,813,611, dated November 19, 1957. Divided and this application January 22, 1957, Serial No. 635,311

2 Claims. (Cl. 197—66)

This invention relates to a power-operated calculating machine of the type adapted for bookkeeping operations wherein debit and credit transactions are printed on one or more record sheets inserted in an automatic return cross tabulating and vertical feed paper carriage. The paper carriage is of the type having a platen around which a journal sheet may be wrapped by being inserted from the rear, and is equipped with a front-feed construction, which may be opened to receive ledger and customers' record sheets from the front, to cooperate with the journal sheet and be printed simultaneously therewith by manifold transfer means.

This is a division of the application for United States Letters Patent, Serial No. 412,302, filed February 24, 1954, by the present applicants, now Patent No. 2,813,-611, issued on November 19, 1957.

The basic construction of the machine is an add-subtract adding machine having two totalizers, automatic credit balance mechanism, automatic true positive or negative total-taking mechanism, and printing mechanism for printing entries and totals. The entries made into the machine either additively or subtractively are entered into both totalizers, but the totals are taken from either one or the other of the totalizers.

The machine is equipped wih automatic cross-tabulating mechanism and with automatic mechanism controlled from the moving carriage to variously cause an amount set up on the keyboard to be entered into the totalizers positively or negatively, and to take automatic sub-totals and totals at selected positions of the movable carriage.

The carriage is automatically tabulated and returned, with an accompanying opening of the front-feed mechanism wherever desired, in either direction of carriage travel, whereby the ledger sheet and the customer's statement may be withdrawn and replaced with another ledger sheet and another customer's statement.

The machine is equipped with mechanism for selectively determining from which totalizer a total is to be taken, and with mechanism for overcoming a subtract condition set up by the carriage, so that an entry set up on the keyboard will be entered into the totalizers positively instead of negatively.

There are provided a number of selective controls for line-spacing the record materials vertically by means of the carriage opening and also by means of the mere operation of the machine. Manually-operated means is provided for causing the carriage to space vertically upon a machine operation and, if further operated, to cause such vertical spacing to be accompanied by a return of the carriage to a preselected column.

Various controls are provided for rendering inoperative the normally automatic mechanism for tabulation, vertical paper feed, automatic taking of sub-totals and totals, and automatic carriage opening.

Means is provided for printing dates and folio or reference numbers without entering the amounts so set up into the totalizers. The printing mechanism is provided with controls which may be automatically or manually operated to prevent amounts that are set up on the differential mechanism from being printed, or may prevent such amounts from being printed in certain denominational orders.

The carriage has in its front-feed construction means for having it fully open, whereby record material is easily inserted from the front, and means for moving it from fully-opened position to half-opened position, where the front-fed record material may be alined to the desired printing position.

A vertical spacing control is provided, which suppresses the tabulating mechanism, so that the machine, instead of being conditioned for cross-tabulation, is conditioned for vertical listing of the record material, whereby the machine acts as an ordinary add-subtract listing machine.

Novel electric means is provided for opening the main motor circuit while the carriage is open.

Automatic disabling means for the automatic total-taking and sub-total-taking means is provided, and certain novel features of carriage construction will be disclosed.

The novel construction provides symbol-printing mechanism under selectively-operable key control.

A full flexible keyboard of digit keys is provided to set up entry data.

In the preferred embodiment of the machine, the automatic mechanism controls are set so that the carriage is automatically tabulated from a starting position as the various entries are being made on the record material, after which the carriage is returned to starting postion, accompanied by carriage opening. After an explanation of the preferred embodiment, the various changes which may be made in the operation of the machine will be explained.

Therefore, it is an object of the invention to provide a fully-automatic printing-calculating machine, capable of recording debit and credit transactions and resulting new balances, all but the amount-setting-up functions being performed automatically.

It is another object of the invention to provide such a machine with a so-called full keyboard; that is to say, one in which there are provided a plurality of rows of amount keys, each of which contains the digits from 1 to 9 of the decimal system, or the digits of any other numerical denominational order upon which the machine may be based.

It is another object of the invention to provide an improved front-feed carriage which is so constructed and so operated by the machine that, in addition to automatically tabulating to various printing columns under control of stops, it also automatically returns to initial position, and in addition it may be dominated by controls manually operable to overcome preset operating conditions.

The machine is constructed with novel mechanism for advancing the paper feed vertically by one or more lines under control of the machine operation with or without use of a vertical feed key, or under control of the carriage opening mechanism, or both.

A further object of the invention is to provide means by which the automatic mechanism may be disabled, so that the totals and sub-totals are not taken automatically but are taken under control of the operator by manual means.

It is a still further object of the invention to provide such a machine in which the automatic controls may be so disabled that it may be used as an add-subtract machine with vertical listing of the transactions.

Another object of the invention is to provide a manually-operable vertical feed control which overcomes the automatic tabulation of the machine during a machine cycle, so that, instead of the horizontal adjustment of the paper carriage relative to the printing station, the paper is fed vertically, and, in addition, if the manually operable vertical feed is held down to the end of an operation of the machine, the carriage is returned to the right, to a predetermined position.

Another object of the invention is to provide selective means for causing the carriage to open either in its tabulating movement or in its return movement, or both.

Means is provided to disable the power means for operating the entry mechanism when the carriage is open.

Various interlocking mechanisms of novel design are provided, so that misoperation of the machine will be prevented, such interlocking mechanisms being between the various control keys and automatic mechanisms.

With these and incidental objects in view, the invention includes certain novel features of construction and combinations of parts, a preferred form or embodiment of which is hereinafter described with reference to the drawings which accompany and form a part of this specification.

Of the drawings:

Fig. 7 is a plan view of the base of the machine, showing the mounting of the machine trip link and the total-taking and sub-total-taking solenoids.

Fig. 8 is a view of the machine trip lever and main motor switch.

Fig. 9 is a diagram of the main motor circuit.

Fig. 10 is a rear elevation of the carriage and associated mechanism.

Fig. 11 is an elevation of the right end of the carriage.

Fig. 12 is a detail of the machine-actuated ratchet for vertical feeding of the record material.

Fig. 13 is a detail of the ratchet mechanism for vertically feeding the record material by carriage opening.

Fig. 14 is a left side elevation of the carriage.

Fig. 15 shows parts of the carriage return mechanism in exploded form.

Fig. 16 shows the vertical feed motor bar 27 and associated linkage for enabling the vertical feed from machine operation.

Fig. 17 shows mechanism for disabling the tabulating stop bar on return of the carriage, and a portion of the vertical feed motor bar mechanism.

Fig. 18 shows a linkage whereby the machine cannot be tripped when not in contact with a carriage stop.

Fig. 19 shows parts of the carriage return control mechanism for disabling automatic return of the carriage during listing operations.

Fig. 20 shows the carriage latch, the hand-operated lever for opening the latch, and the automatic means for opening the latch.

Fig. 21 is an exploded view of the motor-driven return mechanism, including the clutch.

Fig. 22 shows the switch mechanism for disabling the main motor circuit when the carriage is open.

Fig. 23 shows the listing and tabulating control and the mechanism for disabling the automatic total-taking and sub-total-taking mechanism during listing.

Fig. 24 shows the mechanism for closing the total-taking and sub-total-taking solenoid switches by carriage controls.

Fig. 25 is a perspective of the carriage return clutch and immediate controls.

Fig. 26 shows a portion of the linkage for return of the carriage from vertical feed motor bar 27 operation.

Fig. 27 is a modified perspective view of the solenoids and associated micro-switches controlling their energization and de-energization.

Fig. 28 is a wiring diagram of the substance of Fig. 27.

Fig. 29 shows the mechanism for locking the machine trip lever during return of the carriage, and the switch for energizing the motor for returning the carriage.

Fig. 30 is a perspective view of the linkage between the solenoids and the total slide and the sub-total slide.

Fig. 31 is a perspective view taken from the right rear of the machine, looking forward to the machine-operated vertical feed pawl, and ratchet, with the blocking means for the feed bail shown in relation thereto.

DESCRIPTION OF THE FUNCTIONAL OPERATION OF THE MACHINES

Figure 1:
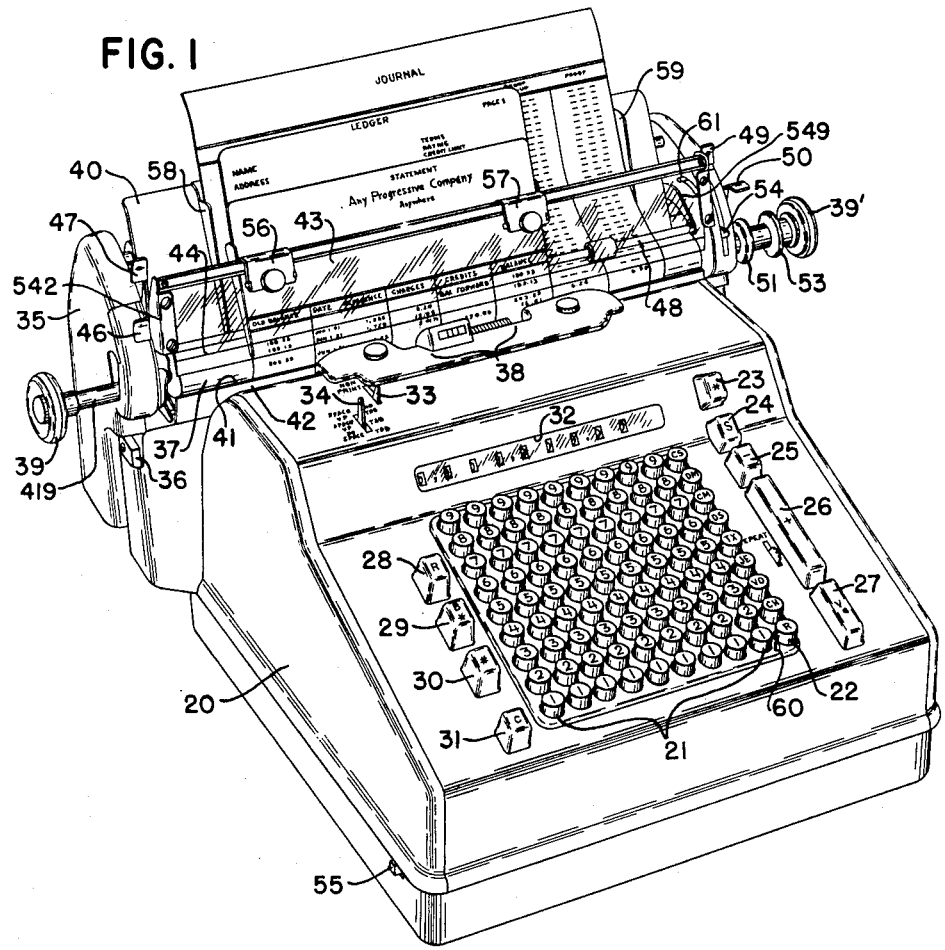
Fig. 1 is a perspective view of the machine with a journal sheet, a ledger sheet, and a customer's statement in place around the record material platen.

Referring to Fig. 1, the machine framework and mechanism, to be described, is covered by a casing 20, through which project nine rows of digit keys 21, a row of symbol keys 22, a total key 23, a sub-total key 24, a subtract key 25, an add motor bar 26, a vertical feed bar 27, a reverse key 28, a "B" total key 29, a non-add key 30, and a correction key 31. The casing has a viewing aperture 32, through which may be seen number drums attached to the totalizer wheels of the upper, or "A," totalizer, the wheels of the "B," or lower, totalizer being invisible. There is provided a lever 33, having a forward position in normal printing operations, said lever being movable to the rear, where it prevents the printing of items or totals. A spacing and tabulating control lever 34 is provided, being movable to any one of three positions, the forward position controlling the paper feed and tabulating mechanisms, so that upon each operation of the machine there is no automatic vertical spacing by reason of machine operation, but the machine tabulates according to the control stops, to be described. If this lever 34 be moved rearwardly one position, the paper will be fed upwardly on each machine operation, and the carriage will tabulate according to the carriage stop controls. If the lever 34 be moved to its rearmost position, the paper will feed vertically on each machine operation, but the carriage will not tabulate. The automatic cross-tabulating carriage 35 is supported upon a carriage support rail 36 and is constantly spring-urged toward the left and will be stopped in various printing positions by control stops, which may or may not also control the type of machine operation. If such stops are not present, the machine will move completely to the left, against a limit stop. Stop controls are provided on the carriage to operate the carriage return mechanism, so that at the end of a series of entry operations the carriage will be clutched to actuating mechanisms which will return it to its rightmost position, or to a selected position as controlled by the carriage stops. The tabulating mechanism will be fully described in detail in what follows. The vertical feed motor bar 27, when held down, returns the carriage to a predetermined stop.

A platen 37 is provided for supporting record material in a manner to present it to the printer 38, which at the proper moment of a machine operation moves rearwardly and prints the entries or totals on the record material held around said platen. The platen may be rotated by knobs 39 and 39' to move the record material in a vertical direction, either up or down, pressure rolls, to be described, holding the paper, whereby the frictional contact with the platen will cause the paper to move. The machine is provided with a paper table 40 (Figs. 10, 11, and 14) to the rear of the platen, and the journal sheet is inserted between the table 40 and the rear of the platen and wound around until it comes through the throat 41 (Fig. 1), upon the turning of knobs 39 and 39', the paper being held in frictional contact with the platen by the pressure rollers. The throat 41 is formed by the platen 37 on one side and a pressure plate 42, extending across the platen and ordinarily held in resilient contact with the platen. A swingable front paper table, or panel, is formed by a transparent plate 43, held in a framework, so that, when the carriage is opened, the table, or panel, will swing forward and downward, carrying the pressure plate 42 away from the platen and at the same time releasing the pressure rolls on the under side of the platen, which will be described, so that the ledger and customer's statement may be inserted between the pressure plate 42 and the platen 37 and between the platen and the pressure rolls, from the front. The front paper table, holding the transparent plate 43, may be closed to a half-open position and resiliently held by a detent, not shown, where a guide line 44 comes into view, the front pressure rolls still being released, and the record material may then be alined on this guide line at the desired printing position. The carriage is then fully closed by the operator, which presses the pressure plate 42 and the pressure rolls against the platen, and the machine is ready to operate. The carriage opening movement is actuated by springs 524 and 525 (Figs. 11 and 14), which are tensioned as the carriage is moved to closed position. The carriage is held closed by a latch, which engages automatically when the carriage is closed by the operator. A front-feed opening lever 46 is provided, said lever, when pushed back, unlatching the carriage, allowing it to open fully, as will be explained later. As indicated, there is an intermediate latch (not shown), which will hold the paper table 43 in partly-closed position. Carriage-opening stops may be provided, and, in the preferred embodiment, one is provided to open the front-feed throat at the beginning of the carriage return operation. The operation of the lever 46, which unlatches the carriage latch, and the subsequent front-feed opening of the throat releases the front pressure rollers, so that the paper may be inserted underneath the platen and out on a back paper table 543 (Fig. 10). A journal sheet release lever 47, when moved rearwardly from a normal forward position to a first moved position, raises a paper bail, 48, having upper pressure rolls, which bear against the journal sheet. If the lever 47 be moved backward farther, to a second moved position, the paper bail is raised farther, and the back pressure rolls are released, so that the journal sheet may be alined properly. The first moved position is for use when the journal is inserted around the platen, the pressure rolls being in engagement, so that they will seize the inserted sheet, the paper bail being raised, so that the sheet may be guided under it. When the customer's statement and ledger sheet is inserted after the front-feed throat is opened, the lever 47 must be in the forward position. On the right side of the machine is provided a front-feed form release lever 49, which, when pulled toward the front of the machine, releases the front pressure rolls and thus releases the front-fed forms in the carriage, permitting free movement of them, so that they may be alined at the exact posting line by the aid of guide line 44.

Also on the right side is a carriage release lever 50, which, when pressed down, disables the tabulating stop bar, permitting the carriage to move in either direction, regardless of the intermediate stops, so that, when the lever 50 is released, the carriage will move against the stop that is next met on the movement of the carriage to the left. The carriage can be moved to the right without any lever's being pressed. Vertical line-spacing is controlled by the movement of a clutch part 51, to which is secured a line-spacing ratchet, to be described later, and is connected to a platen shaft 419 (Fig. 11) by a second clutch part 53, splined to the shaft 419 and held in contact with the clutch part 51 by a spring. Outward movement of the clutch part 53, against the action of the spring, disengages it from the part 51, so that the platen may be rotated for variable line-spacing without regard to the movement of the clutch part 51. The clutch part 51 is solid with a vertcial space-up ratchet wheel, which is given a step-by-step movement each time the machine operates and each time the front-feed paper table is opened to fully-opened position, except that controls are provided to regulate the vertical feed movement by the machine operation to no movement at all or to one or two spaces per machine operation, and there is provided a lever 54, which may be selectively moved to accomplish this control. Another lever 61 controls the amount of vertical spacing when the carriage opens, so that, by its selective use, the platen will not vertically space at all or will space either one or two spaces according to the adjustment thereof. The machine is equipped with electro-mechanical means for taking sub-totals and totals in certain column positions, automatically, by reason of special stop controls, which operate solenoids. An electric switch 55 is provided to break the electric circuit which supplies electric power to the solenoids to disable such automatic taking of sub-totals and totals, if so desired.

Paper guides 56 and 57, slidably mounted on the upper edge of the front paper table, are adjustable to accommodate the width of the customer's statement and ledger sheet, so that proper alinement of them with respect to the journal sheet may be had. On the rear paper table 40 (Fig. 1) are adjustable paper guides 58 and 59, which may be selectively positioned to aid in the insertion of the journal sheet with respect to the customer's statement and ledger sheet.

Preliminary to a description of the mechanism of the machine, a brief summary of a typical operation will be given. The paper carriage front feed is opened to its full extent by pushing back on thumb piece 46, as will be explained, and the journal sheet is inserted between the platen 37 and the rear paper table 40 and wound around the platen by use of the knobs 39 and 39', the lever 47 having previously been moved rearwardly to its first position to position the pressure plate 42 against the platen and raise the paper bail 48, so that the top of the journal sheet may pass thereunder. The journal sheet is turned to the approximate position at which the entries are to be started, and the lever 47 is pushed farther rearwardly to the second moved position. Then, by hand, the journal sheet is adjusted as to vertical and horizontal alinement, whereupon the lever 47 is drawn forward to normal, which causes the paper bail 48 to drop against the top of the journal sheet, holding it against the platen and causing the rear pressure rolls to hold the bottom of the journal sheet against the platen, so that movement of the platen shaft in a rotary direction will move the journal up or down, as desired. The front-feed throat is then open, as will be explained in the sections on "The Front-Feed Paper Holding Mechanism" and "Automatic Carriage Opening." The ledger sheet and customer's statement sheet are held together and then fed around the platen by being slid between the guides 56 and 57 on the now-opened transparent paper table 43, and inserted beneath and around the platen. The paper table 43 is moved toward closed position, where it is held halfway by a latch, and the ledger and customer's statement are alined by means of the guide line 44, so that the next printing line is in alinement therewith. The paper table is then closed, which closes the throat, and the carriage is moved, by hand, so that the left-most printing column is opposite the printer 38. By use of the lever 49, the front-fed record material is released if further adjustment is required. The printing columns are determined by the tabulating control stops in the rear of the machine, to be described later, and, in the preferred embodiment, shown, the printing columns are, reading from left to right, the Old Balance column, to which the carriage is moved, by hand, for the first entry. The next printing position, as the carriage moves to the left, is the Date and Reference, or Folio, column; then, in turn, the Charge column, the Credit column, the Balance column, the Proof Pickup column, and the Proof column, which is the last column to be printed. The ledger sheet and the customer's sheet do not extend over the last two columns. The carriage being in the Old Balance column, the old balance is noted from the last ledger item for the customer and is set up on the digit keys, and the add motor bar 26 is depressed. This sets the machine in operation, entering into both the upper, or "A," totalizer, and the lower, or "B," totalizer, the old balance amount, which is printed at mid-cycle. The carriage automatically tabulates to the Date and Reference column. Previously, for a series of transactions, the month, the day, and the year are set up on the rotary date wheels, which are to the left of the printer, the reference number is set up on the dollar keys of the keyboard, the cents keys being suppressed by a printing hammer control means, and the machine is operated by means of the motor bar 26, printing the date and the reference number but not adding anything into either totalizer, as a non-add control stop, at this point, prevents said totalizers from being engaged with the actuator racks, to be described. The machine then tabulates to the Charge column, and, if there is any charge, the amount is set up on the digit keys and the motor bar 26 is operated, causing a machine operation in which the amount set up on the keyboard is entered into both totalizers additively. If desired, one of the keys on the right side of the keyboard, which operate the symbol type, is depressed, indicating the nature of the charge. As seen in the preferred embodiment, the top key, which bears the symbol "CS," is for a cash entry; the second key from the top bears the symbol "DM," which indicates a debit memo; the third key from the top, bearing the symbol "CM," indicates a credit memo; the fourth key from the top, bearing the symbol "DS," indicates a discount; the fifth key from the top, bearing the symbol "TX," indicates a tax entry; the sixth key from the top, bearnig the symbol "JE," indicates a journal entry; the seventh key from the top, bearing the symbol "VO," indicates a voucher entry; and the eighth key from the top, bearing the symbol "CH," indicates a charge entry. The bottom key in the row, bearing the symbol "R," is a repeat key, and, if it is pushed down, together with another one of the keys of the row, and latched there by a latch 60, the selected symbol will be repeated on each subsequent entry operation.

If there is more than one charge entry, the vertical feed motor bar 27 is used instead of the add motor bar 26 to suppress tabulation, to make the first entry. Then, on operation of the machine and the printing of the entry, it will vertically space, so that an additional entry may be made in the "Charge" column. If the vertical feed motor bar 27 be held down through the end of the cycle, not only is the tabulation suppressed, but also the carriage will move to the right one position, so that a new date and folio entry may be made. Then the carriage tabulates to the "Charge" column. This may be continued as long as there are multiple charges in the transaction. On the last charge entry, if there be more than one, the add motor bar 26 is used, which automatically causes tabulation of the carriage to the Credit column, in which position of the carriage a stop thereon conditions the machine for a subtract entry. The credit is then set up on the keys in conjunction with one or more of the symbol keys, if desired, and the motor bar is depressed, entering the credits subtractively. As with the "Charge" column, the vertical feed motor bar 27 may be used to enter more than one credit in the transaction, as was the case with the "Charge" column. On the entry of the last credit, by use of the add motor bar 26, the carriage tabulates to the "Balance" column, in which an automatic sub-total is taken of the upper, or "A," totalizer, normally being printed in black for a positive balance but printed in red with a negative sign if the balance is a negative balance, and the carriage tabulates to the proof pick-up column on the journal sheet, the tabulating stop controlling such column conditioning the machine for subtraction. The old balance is again entered on the keyboard, and the add motor bar 26 is operated, which automatically subtracts the old balance from the amount in the totalizers and tabulates the carriage to the proof position, wherein the total is automatically taken, and the machine is started on its return to the "Old Balance" column, while the front feed throat and the paper table are thrown open on the return travel, so that the customer's statement and ledger sheet may be withdrawn, the journal, at the same time, automatically spacing up one or more spaces under control of the spacing control levers 54 and 61, or not at all, depending on the position of said levers. A new customer ledger and statement is inserted into the machine and alined, and entries are made thereon, as has just been described. At the end of a day's work, or at the beginning of the next day, the grand total is taken from the "B" totalizer. The upper totalizer should have been cleared out by the last operation. The "B" total may be taken by moving the carriage to the Old Balance position, moving the lever 34 to the non-tabulating position— that is, to the listing position— and depressing the "B" total key 29, followed by depression of the total key 23.

Where it is desired to print numbers without adding them into the totalizer, this may be done by use of the non-add key 30, which conditions the machine for non-adding and also trips the machine to cause a cycle of operation.

In the description which will follow, the different possible combinations of tabulating stops and controls will be described in detail with reference to the type of machine operation control mechanism.

*The main operating means*

The various elements of the machine are supported by a base 79 (Fig. 7), a right side frame plate 91 (Fig. 2), and a left side frame plate 92 (Fig. 3), cross-braced by numerous cross-rods and special braces and supplied with various brackets, upon which the machine elements are secured, as will become apparent.

Figure 3:
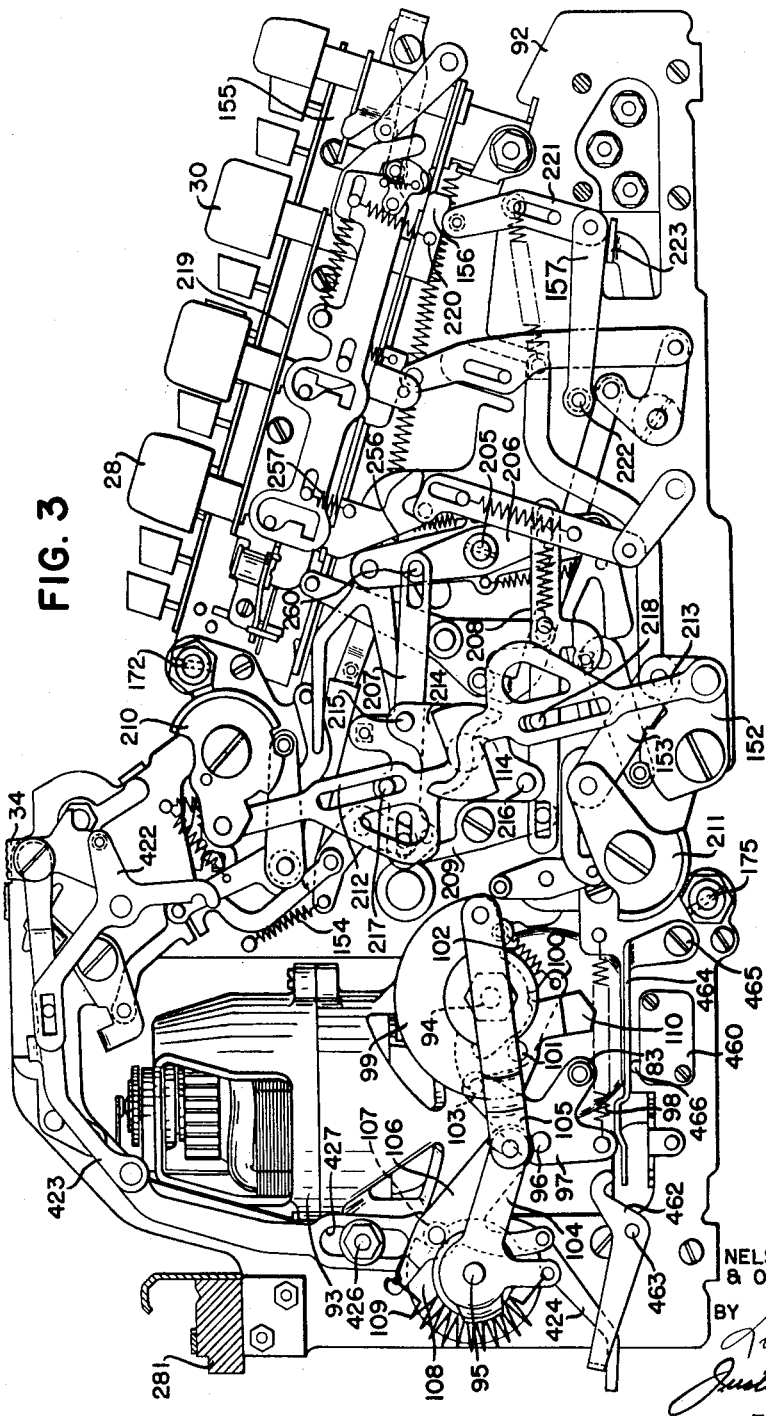
Fig. 3 is a left side elevation of the machine with the casing and the carriage removed.

Referring to Fig. 3, the machine is equipped with an electric motor 93, which drives the machine through cycles of operation under control of cycle control means, and which also returns the carriage to its rightmost position under control of the selectively-placed carriage tabulating stops and associated mechanism.

The motor, through reduction gearing, drives a motor shaft 94 (Fig. 3) to operate the main operating means under control of the cycle control means.

The main operating drive elements, including the motor 93, the motor switch 89 (Fig. 8), the tripping mechanism, and the single-cycle clutch mechanism, are substantially the same as those disclosed in applicant's co-pending application for United States Letters Patent, Serial No. 349,228, which issued on October 26, 1954, as Patent No. 2,692,726, and to which reference is directed. The machine is tripped by clockwise rocking of a trip lever 88 (Fig. 2), which pulls forward on a link 87 (see also Fig. 7) pivoted to a lever 86 pivoted at its right end to the base of the machine and having on its left end a finger-like portion, which fits into an opening in a trip latch 85 (see also Fig. 7) pivoted on part of the machine frame. The rocking of the trip lever 88 (Fig. 2) rocks the trip latch 85 (Fig. 8) clockwise, allowing a three-armed lever 97, mounted on a shaft 96, to rock clockwise as seen in Fig. 8, and counter-clockwise as seen in Fig. 3, under the urge of a spring 98. A stud 84 on the lever 97 rocks a lever 80, rockably mounted on the shaft 96, and the upper end of the lever 80 closes the main motor circuit, as seen in Fig. 9.

The machine is driven through one cycle of operation on add, subtract, and non-add operations, and through two cycles of operation on total-taking or sub-total-taking operations. A one-cycle operation consists of the rocking of the main drive shaft 95 (see Figs. 2 and 3) first clockwise, as seen in Fig. 3, and then counter-clockwise. In two-cycle operations, the shaft 95 rocks twice.

When the motor switch 89 is closed, the motor starts and turns the motor shaft 94 counter-clockwise. The shaft 94 has secured thereto a notched drive wheel, concealed behind a crank plate 99, loosely mounted on the shaft 94. A drive pawl 100 is pivoted on the plate 99 by a stud 101 and is urged in an engaging direction, toward the notched drive wheel on the shaft 94, by a spring 102. The pawl 100 is disengaged from the notched wheel when the machine is in rest position by reason of a stud 103 on the lever 97 bearing against the pawl 100. However, as soon as the lever 97 rocks counter-clockwise, as seen in Fig. 3, when the machine latch is tripped, and the motor starts, the pawl 100 is released and engages the notched drive wheel, rotating the crank plate 99 counter-clockwise. The main drive shaft 95, journaled in the side plates 91 and 92, has loosely mounted thereon a crank 104, connected to the plate 99 through a drive link 105. The crank 104 is coupled to the main drive shaft 95 by a yielding driving connection including a lever 106, pivoted to the crank 104 and having on its rear end a roller 107, held in a notch in the edge of a plate 108, secured to the drive shaft 95, by a strong spring 109. The spring 109 is strong enough to hold the roller in the notch to form a driving connection between the crank 104 and the shaft 95 during all normal operations of the machine. The driving connection will yield, however, to any overload placed on the main drive shaft. As the plate 99 completes one rotation, an arm 110 thereof strikes a roller 83 on the lever 97, rocking it to normal position, which opens the motor switch and relatches the tripping mechanism by a stud 82 (Fig. 8) rocking the trip latch 85 to effective position. Thus, the mechanism so far described constitutes the single-cycle mechanism of the machine. Under the circumstances of a total or a sub-total taking place, means is provided for causing a second cycle to occur immediately after the first cycle, as these are two-cycle operations. Moreover, in the event the carriage return mechanism is operated, the motor will continue running after the single-cycle mechanism has come to a halt, there being another electric circuit means to the motor to be completed by the closing of a switch 81 (Fig. 9).

Figure 2:
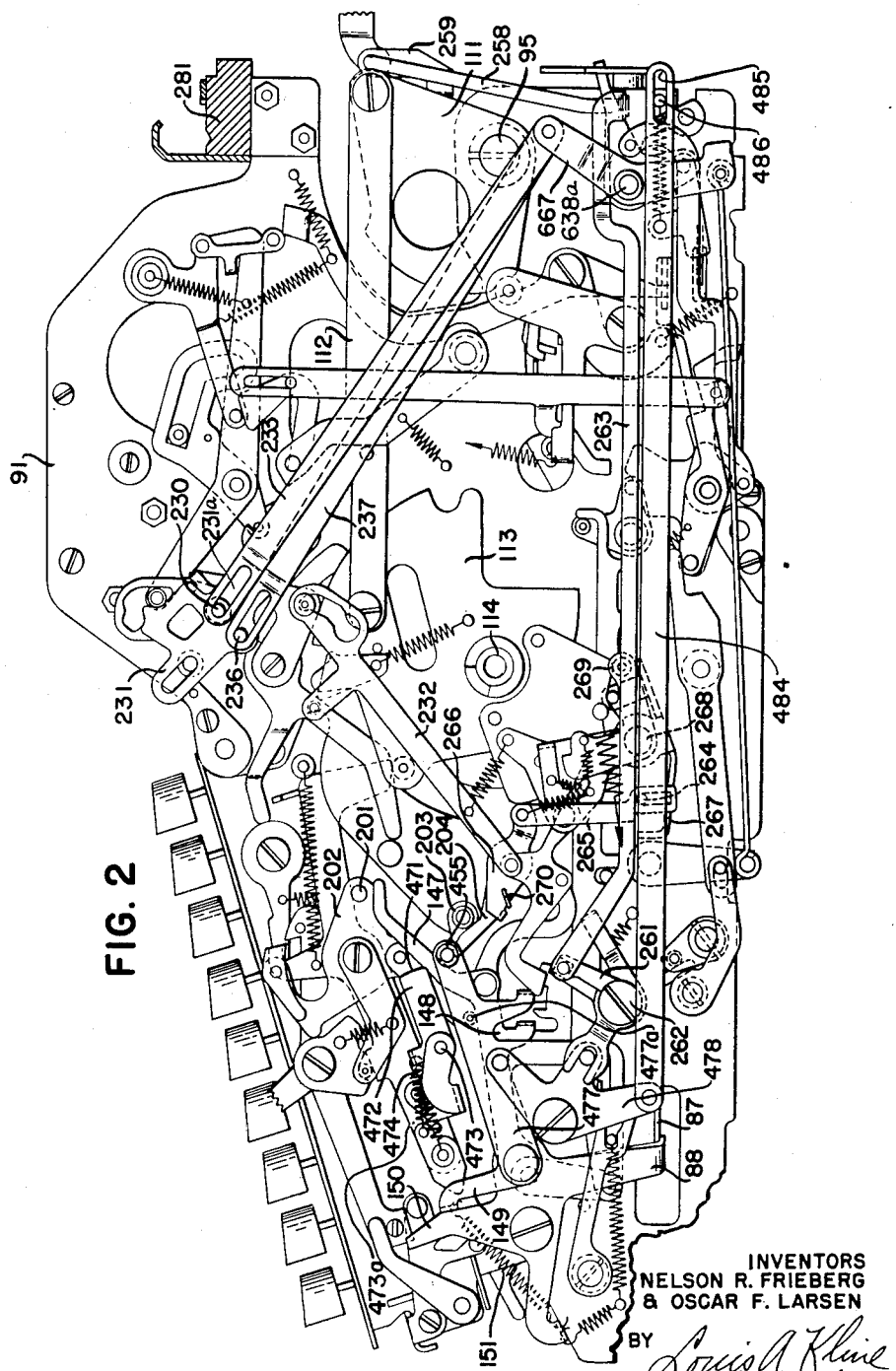
Fig. 2 is a right side elevation of the machine with the casing and the carriage removed.

Referring to Fig. 2, the main drive shaft 95 has secured thereto a drive plate 111, connected by a link 112 to a cam plate 113, secured to a drive shaft 114, extending between the frame plates. Hence, in one cycle of operation, the drive shaft 114 is rocked first counter-clockwise and then clockwise to form one cycle of operation.

*The keyboard and the printer*

Figure 4:
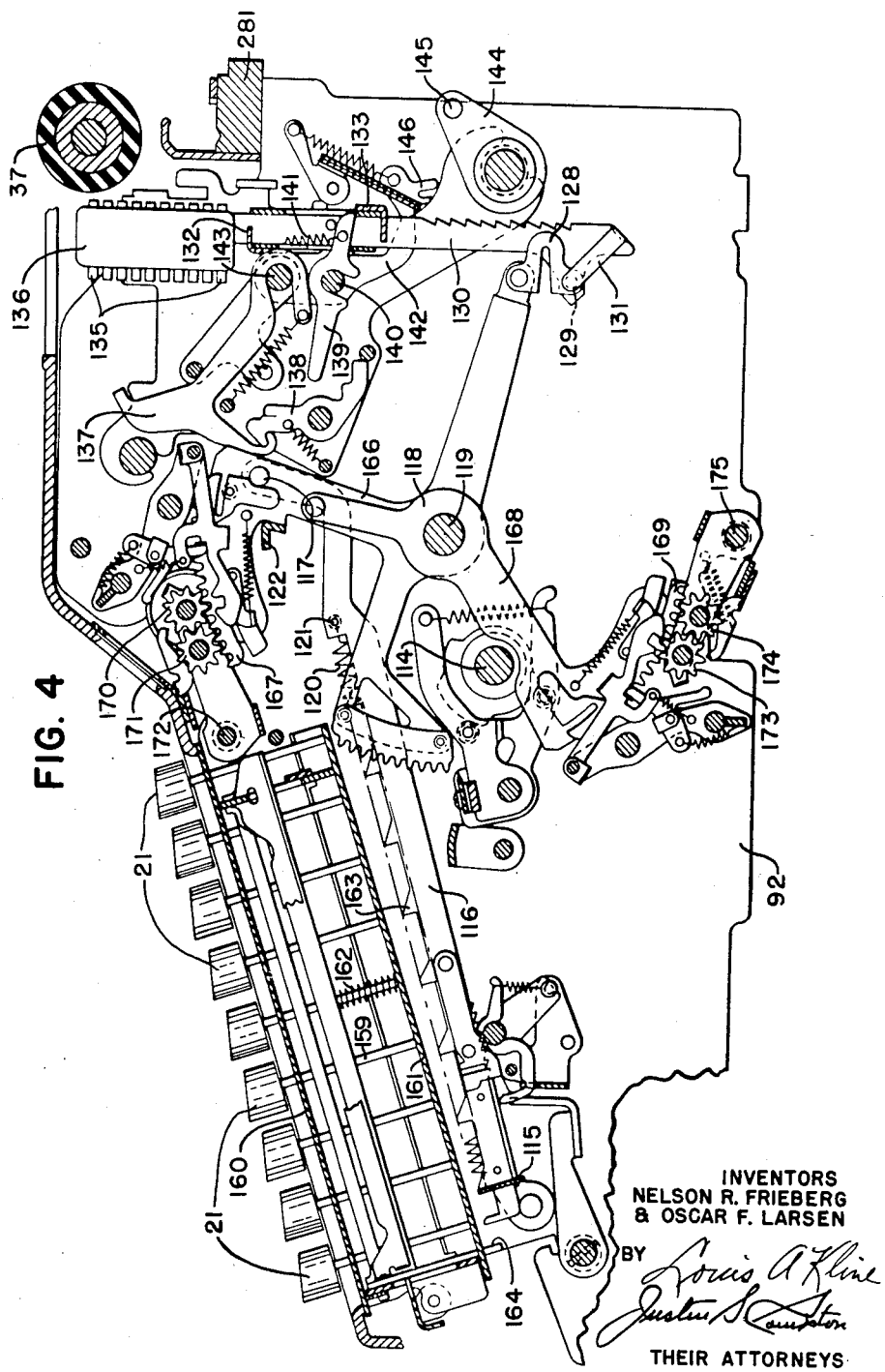
Fig. 4 is a typical vertical section from front to rear, showing a denominational order of the keys and the stop bar, the differential mechanisms, the totalizers, and the printing mechanism associated therewith.

Secured between the front end of the right vertical side frame plate 91 (Fig. 2) and the front end of the left vertical side frame plate 92 (see Figs. 3 and 4) is a slotted plate or comb 115 (Fig. 4), in which the front ends of a series of denominational order stop bars 116 are guided and supported for sliding movement. There is one stop bar for each denominational order. As the stop bars of all orders are constructed the same, a typical order only is shown in Fig. 4, as an example. The stop bar 116 is pivoted at the rear end by a stud 117 to the upper extending arm of a fabricated three-armed diverging lever 118, pivotally mounted on a cross shaft 119, extending between the said side frame plates, and is normally urged forwardly by a spring 120, stretched between a stud 121 on the diverging lever and the comb 115. The stop bar normally is held against forward movement by a bail 122, extending across the front of the upwardly-extending arms of all of the diverging levers, and is held between two arms pinned to the shaft 119. The right arm, 123 (Fig. 5), has a downwardly-extending portion pivoted to a link 124, having rotatably mounted thereon a roller 125, which is held in engagement with the edge 126a of a cam 126, pinned to the drive shaft 95, by the springs 120 (Fig. 4), causing the upper arms of the levers 118 to bear against the bail 122. The rear end of the link 124 (Fig. 5) has a forked end, which embraces and rides the shaft 95 for support. As the shaft 95 rocks counter-clockwise a little over eighty degrees, the shaft 119, therefore, will do likewise, causing the forward and downward movement of the bail 122 by reason of the urge given to the diverging levers by the springs, like spring 120 (Fig. 4), urging the stop bars forward. On return movement of the bail 122, on the clockwise movement of the shaft 95, the stop bars will be returned to the rest position (Fig. 4). A rearwardly extending arm of the diverging lever 118 is pivoted to one end of a U-shaped adjusting link 128, the other end of which is pivoted on a stud 129 of a printer bar 130, where it is retained by a spring clip 131. The printer bar 130 is movable vertically in slotted guides 132 and 133, with respect to the paper platen 37, shown diagrammatically in Fig. 4, according to the selected positioning of the diverging lever 118 under control of the associated keys. The platen and associated mechanism will be described in detail later on with respect to the automatic cross tabulating carriage. The printer bar 130 has, at the top end, ten vertically-spaced type 135, movable individually, in a case 136, toward the paper platen when positioned to print. The type are urged to retracted position by springs within the case 136, and the particular type in printing position is hit by the printing hammer 137 when released from the cocked position, at printing time, by the tripping of a latch 138. When the type bar is selectively raised to printing position, an interponent 139 rocks counter-clockwise on a bail 140 under the urge of a spring 141.

The bail 140 is secured between an arm 142 and another arm, like the arm 142, secured on a shaft 143. The bail 140 extends across the printer. A cam lever 144, secured on the shaft 95, is rocked counter-clockwise and then clockwise during a machine operation, and a stud 145 thereon strikes the tail 146 on the arm 142, rocking the bail and the rocked interponent 139 toward the lower step of the latch 138, which thereby is moved to unlatching position at mid-cycle, but only if the printing bar 130 has been moved from home position so as to render the interponent 139 ineffective, causing the printing hammer 137 to hit the type which is positioned at the printing point.

The described printing mechanism is duplicated in the rest of the denominational orders except that the rearwardly-extending arms of the three-armed diverging levers, like the lever 118, in order to connect the associated printer bars, which are crowded together, as shown in Fig. 1, instead of being in line with the respective key bank denominations, are bent according to the relative lateral position between the stop bar and its associated printer bar.

The digit keys, the differential mechanism, and the printing mechanism described are old in principle, being disclosed in the aforementioned United States Patent No. 2,692,726, of Nelson R. Frieberg et al. The rightmost bank of keys 22, as has been said, is used for setting up symbol type, and the printer bar associated with that row of digit keys having symbol type operates the same as that for the digit keys themselves.

The digit keyboard

Each of the digit keys 21, shown in Fig. 4, has a stem, like the stem 159, which stems are slidably mounted in the alined slots in an upper keyboard plate 160 and a lower keyboard plate 161 and are urged upwardly by individual springs, such as spring 162, only one being shown. Each of the digit keys may be depressed against return action of its spring until its stem extends below the plate 161, where it is in line with one of the stop members 163 on the stop bar 116, corresponding to said depressed key. The keys are latched down by flexible latch mechanism, whereby, if one key in a row be depressed, another then-depressed key will be allowed to resume normal position under action of the associated spring. This flexible latching mechanism is old and well known in the art and will not be described here, because it has no particular bearing upon the invention, and reference is made to United States Letters Patent to Charles Schroder No. 2,062,731 and to United States Letters Patent to Harry L. Lambert No. 2,389,062 for more detailed description of the digit key bank construction. If a digit key is operated and the add motor bar 26 or the subtract key 25 is operated, the trip lever 88 (Fig. 2) is rocked, setting the machine into operation, and the diverging lever 118 associated therewith will swing counter-clockwise until the stop formation 163 will strike the key stem of the digit key, positioning the diverging lever 118 to correctly set the printer bar with the type of the value of the depressed key at printing position.

The depression of a digit key operates, also through mechanism shown in the Schroder patent to which reference has been made, to move aside the zero stop member 164, which otherwise would block the stop bar 116 after it has traveled a short distance necessary to set up a zero at printing position. On an upwardly-extending arm 166 of the diverging lever 118 is a rack 167, and on a lower-extending arm 168 of the diverging lever 118 is mounted a rack 169. These racks operate, respectively, to enter data into and take data from the upper and lower totalizers.

The totalizers

The upper totalizer consists of a pinion 170 for each of the denominational orders and a cooperating subtract pinion 171 in mesh therewith mounted on rods in a frame pivotally mounted on a cross rod 172. In a similar manner, the lower totalizer has a main totalizer pinion 173 and a cooperating subtract pinion 174 for each denominational order and mounted on rods in a frame pivoted on a cross shaft 175. Suitable transfer mechanism is provided between the pinions for causing the carry-over of one digit from a lower order to a higher order, and overdraft mechanism is provided to cause an entry of a "fugitive" one into the lower order whenever a totalizer passes through zero, going either from a positive condition into a negative condition or from a negative condition into a positive condition. All this is fully described in the application for United States Letters Patent Serial No. 323,462, filed by Nelson R. Frieberg and Oscar F. Larsen on December 1, 1952, which issued on August 28, 1956, as Patent No. 2,760,722. Inasmuch as the totalizer transfer and "fugitive" one mechanism forms no part of the novelty of the invention, a detailed description thereof will not be included in the specification, and reference may be made to the aforementioned patent for a complete disclosure of this mechanism.

Totalizer-engaging mechanism

The main totalizer pinions, corresponding to the pinion 170 in the upper totalizer and to the pinion 173 in the lower totalizer (Fig. 4) are normally in alinement with their respective racks and, when the machine is at rest, are in engagement therewith. By swinging away from their respective racks, the pinions are disengaged from the totalizer. The machine is so constructed that in an entry operation, if the previous operation has left the totalizers in add position, the pinions corresponding to the pinions 170 and 173 are thrown out of engagement with their respective racks during the first half-cycle of machine operation, after which the racks are set to the proper value position, and the add or subtract pinions are then re-engaged with the racks during the second half-cycle of the machine operation, during which time the value set up on the racks is entered into the pinions. If the entry operation is a subtract operation, the totalizers are slid to the left before engagement until the subtract pinions are in alinement with the racks corresponding to the racks 167 and 169, and the subtract pinions are engaged during the last half cycle of operation, the amounts being entered and turning the totalizer pinions corresponding to the pinions 170 and 173 in the reverse direction to enter the amount negatively thereinto.

If the totalizers have been in subtract position, they stay in that position if the entry is a subtract entry, or they move to add position if the entry is an add entry. In sub-total-taking timing, the racks and pinions are left in engagement during both halves of the second of the two cycles of operation, and the sub-total is printed at mid-cycle. In total-taking operations, the pinions are left in engagement with the racks during the first half cycle of the second of two machine cycles and are disengaged in the last half of such second cycle of a two-cycle total-taking operation.

Automatic sensing means is provided, to be operated in total-taking or sub-total-taking operations, so that, if there is a negative amount in the totalizer, the totalizer from which a sub-total or a total is to be taken is moved to the left to engage the subtract pinions, this being done automatically, as described in the aforementioned Frieberg and Larsen patent.

Figure 5:
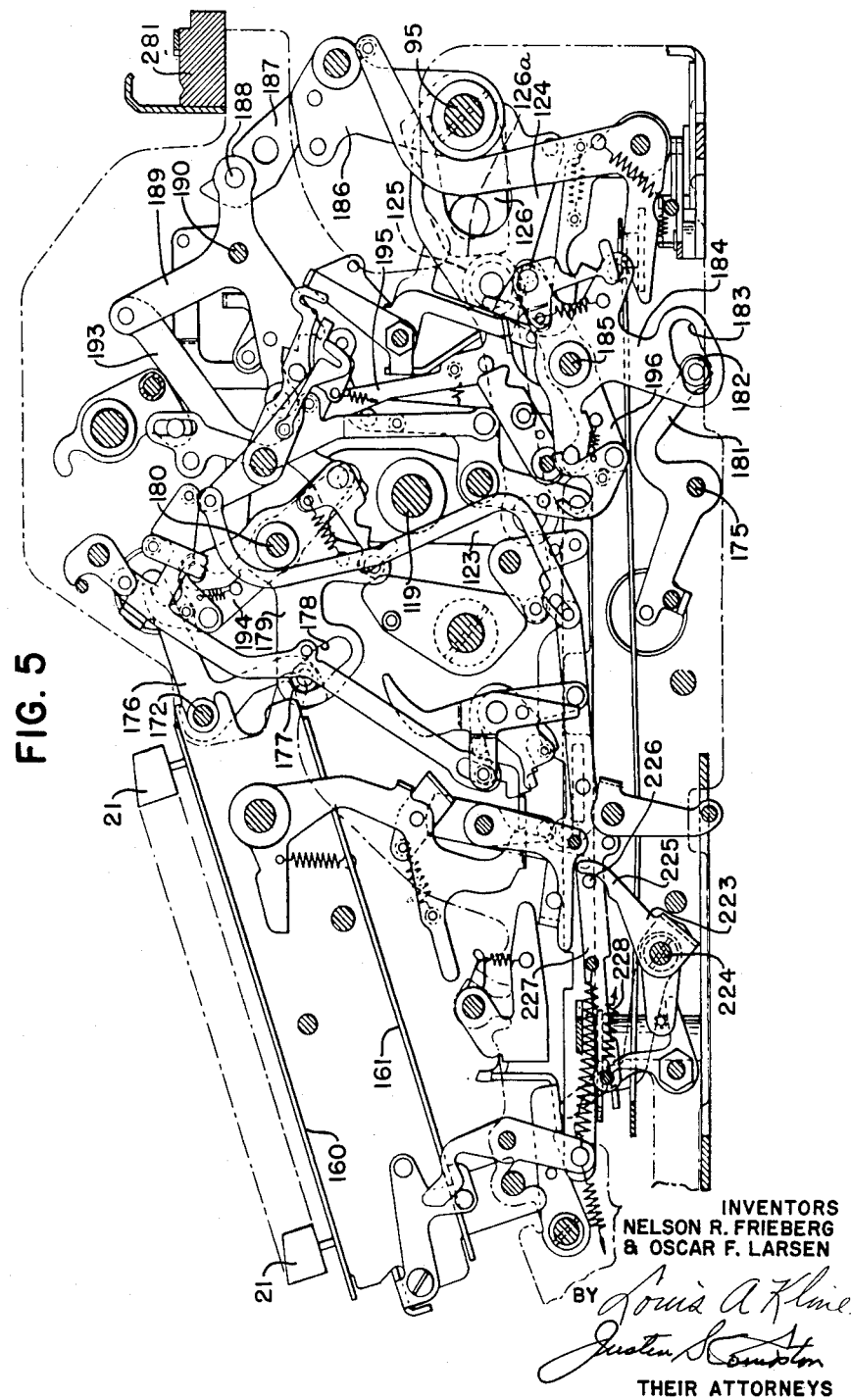
Fig. 5 shows the mechanism for controlling the engagement of the totalizers, which mechanism is on the inside of the right vertical side plate.

Referring to Fig. 5, which is an elevation including some of the totalizer control mechanism on the inside of the right frame plate 91, there are shown the right end of the upper totalizer frame support shaft 172 and the right bell crank lever 176, secured thereto, having a lower extending arm with a roller 177, which rides in a cam slot 178 in a totalizer-engaging plate 179, pivotally mounted on a frame-supported stud 180. If the plate 179 be rocked clockwise from its home position until the roller is in the lower part of the slot 178, the bell crank 176 is rocked counter-clockwise, disengaging the upper totalizer from the associated racks of the differential mechanism. Similarly, a bell crank 181, pivotally mounted on the right end of shaft 175 of the lower totalizer frame, has a roller 182, riding in a cam slot 183 in a totalizer-engaging plate 184, pivotally mounted on a frame-supported stud 185. In adding and subtracting operations, as has been said, both totalizers are engaged with their respective racks in every entry operation. On the main drive shaft 95 is an arm 186 having pivoted at its outer end a hook lever 187, which engages a stud 188 on a multiple-armed lever 189 pivoted on a frame-supported stud 190. On each machine operation, unless otherwise controlled, the arm 186, through the hook lever 187, rocks the multiple-armed lever 189 first counter-clockwise and then clockwise on each machine operation. Pivoted to an upwardly-extending arm of the multiple-armed lever 189 is a pitman 193, which cooperates with studs on a lever 194, mounted on the stud 180, in adding and subtracting operations. The pitman 193 is coupled through the lever 194 to the plate 179, so as to give it, in the first half of a machine cycle in which entries are made, a clockwise movement, which disengages the upper totalizer. Near mid-cycle, the plate 179 is rocked back to normal position by the pitman 193, which re-engages the upper totalizer, so that amounts may be entered into it. The lateral position of the totalizer determines whether such entries are to be made additively or subtractively. In a similar manner, a pitman 195, pivoted to another arm of the lever 189, cooperates with a lever 196, pivotally mounted on the stud 185, for actuating the plate 184 in item-entering timing. In the taking of sub-totals and totals, and in non-add operations, the control of the engaging mechanism for the totalizers is changed. In non-add operations, the totalizers are disengaged at the beginning of a machine cycle and are not engaged until the end thereof. The engagement during sub-total-taking and total-taking operations has been explained as regards the timing, but in such operations one of the totalizers must be disabled, so that it is out of engagement during the total-taking operation or sub-total-taking operation of the other totalizer.

In the construction of this machine, it has been arranged to operate some of the manually-operated control key mechanisms by the stops on the carriage.

Reference is made again to the Frieberg and Larsen patents, mentioned above, for more details of the totalizer-engaging mechanism, as a complete explanation is not necessary for an understanding of this invention.

The subtract mechanism

Figure 6:
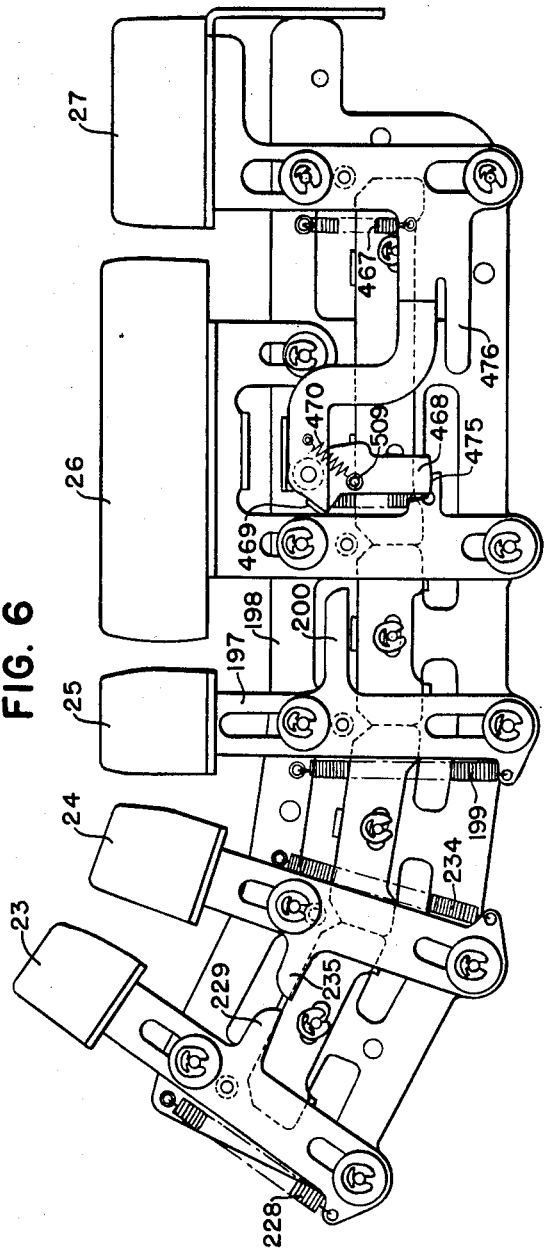
Fig. 6 shows the control keys on the right side of the machine as situated in the supporting bracket on the inside of the right side of the casing.

Referring to Figs. 2, 3, and 6, the Subtract key 25 has a stem 197, mounted by a stud-and-slot connection to a bracket 198, secured to the inside of the casing, and is normally held in an "up" position by a spring 199, but it may be depressed against the urge of said spring. The Subtract key stem has an extension 200, which, when the Subtract key is depressed, bears down on a stud 201 on a subtract plate 202 (Fig. 2) pivoted to the right side frame plate 91. On a downwardly- and rearwardly-extending arm of a plate 202 is mounted a roller 203. As the Subtract key is pressed down, the plate 202 rocks clockwise, as seen in Fig. 2, and the roller 203 bears down on an arm 204, secured to a subtract cross-shaft 205, the left end of which is seen in Fig. 3, rocking the shaft clockwise, as seen in Fig. 3. The stud 201, at the same time, bears down on a rearwardly-extending arm 147 of a lever 148 pivoted to the trip lever 88 and secured thereto by an arm 149, held against an arm 150 by a spring 151, rocking the trip lever 88 to set the machine in operation. As seen in Fig. 3, the subtract cross-shaft 205, rocking clockwise, carries with it a lever 206, secured thereto, which is connected by top and bottom links 207 and 208 to a lever 209, pivoted to the left side frame plate 92. Pivoted to the left side frame plate 92 are a totalizer shift cam 210, cooperating with the totalizer support shaft 172 for the upper totalizer, and a totalizer shift cam 211, having a cam portion which cooperates with the lower totalizer support shaft 175. A roller stud, extending radially from the shaft 172, rides in a cam slot on the periphery of the cam 210, and in a similar manner a stud on the shaft 175 rides in a peripheral cam slot in the cam 211. In the position shown in Fig. 3, the cam 210 is moved to its most clockwise position, in which the upper totalizer is in the add position, and the cam 211 is likewise positioned in its most clockwise position, in which the lower totalzer also is in the add position. To shift these cams to the counterclockwise position, in which their respective totalizers are moved to the subtract position with respect to the differential racks, the cam 210 is provided with a pitman 212, pivoted thereto, and the cam 211 is provided with a pitman 213, pivoted to a rockable plate 152, to which is coupled a link 153 coupled at its other end to cam 211. On the left end of the drive shaft 114 is mounted a plate 214 having a stud 215 cooperating with the pitman 212, and a stud 216 cooperating with the pitman 213. In the position of the pitmans shown, the studs 215 and 216, as the machine cycles and rocks the plate 214, have no effect on the pitmans 212 and 213, but, if the lever 206 is rocked clockwise by the shaft 205 through the operation of the subtract key or the subtract stop, the pitman 212 is swung counter-clockwise by means of a pin 217 on the link 207, which pin rides in a slot in the pitman 212, and the pitman 213 is rocked counter-clockwise, by a similar pin 218 in the link 208, which rides in a slot in the pitman 213. At the beginning of a machine operation, the pitman 212 is drawn down by the stud 215, and the pitman 213 is drawn up by the stud 216. The cam 210 is rocked counter-clockwise and the cam 211 is rocked counter-clockwise through plate 152 and link 153. This moves the totalizers to the left, or subtract, position, and, on the ensuing machine operation, items set up on the digit keys are entered subtractively into both totalizers.

This subtract control mechanism, including the shaft 205 and the pitmans 212 and 213, is returned to the add position whenever the subtract key is released; or, as will be explained later, whenever a subtract stop on the carriage is moved by movement of the carriage from effective to ineffective position, this restoration of the subtract means being accomplished by a spring 154. Therefore, on the next operation of the machine, after a subtract operation, provided no subtract key or control is effective, the cams 210 and 211 will be turned to the add position at the beginning of the machine operations.

Non-add operations

Referring to Fig. 3, the non-add key 30 is slidably mounted for substantially vertical movement in alined slots in a bracket 219 secured to the left side plate 155 of the key bank unit. The lower end of the key stem of the key 30 has a laterally-extending arm 156, which bears on a stud on the upwardly-extending portion of a slide 221, mounted for up-and-down movement by a stud-and-slot mounting on the left frame plate 92. Depression of the non-add key 30 pushes the slide 221 down, rocking the lever 157, pivoted to the plate 92 at 222, clockwise. The lower end of the slide 221 bears down on a bent-over ear of a yoke 223, mounted on a shaft 224 (see Fig. 5). On the right end of the yoke 223 is secured an arm 225, which embraces the rear edge of a stud 226 on a non-add link 227. The non-add link 227 is ordinarily kept in a rearward position by a spring 228, and this in turn keeps the slide 221 (Fig. 3) in its upper position unless it is pressed downwardly by the key 30. The forward movement of the link 227 conditions the totalizer-engaging mechanism for a non-add operation, as more fully described in the Frieberg and Larsen United States Patent No. 2,760,722, before mentioned.

Total and sub-total taking under key control

Depression of the total key 23 (Fig. 6) against the return action of the spring 228 causes an arm 229 on the key stem to bear down on a stud 230 (Figs. 2 and 30) on a total key slide 231a mounted for sliding movement behind a sub-total slide 231, by slot-and-stud coupling on the right vertical frame plate 91, causing the total slide to move downwardly and rearwardly to set the machine into a two-cycle operation through the downward and forward movement of a link 232 in the manner described in said Frieberg and Larsen patents, mentioned above. In automatic total-taking operations, the link 233 is drawn downwardly and rearwardly by a solenoid, as will be described, which acts on the stud 230 as though the total key has been operated, instituting a total-taking cycle.

In the taking of a sub-total, the key 24 (Fig. 6), mounted in the same way on the bracket 198 as is key 23, and having a return spring 234 to hold it in the undepressed position, when depressed, forces an arm 235 on its key stem against a stud 236 (Fig. 2) on the sub-total slide 231, taking the total slide 231 with it as the stud 230 on the total slide passes through the plate 231, which movement of both slides makes the two-cycle operation a sub-total-taking operation, as described in the aforesaid Frieberg and Larsen patents. This sub-total movement of the stud 236 may be caused automatically by solenoid operation, which draws a link 237 downwardly and rearwardly to operate said total and sub-total slides.

No further description of the total and sub-total operations need be made, as this invention is concerned only with the initiating mechanism therefor.

The reverse key

The "Reverse" key 28, also slidably mounted in the bracket 219 (Fig. 3), has a slanting edge 256, which, when the key is lowered against the return action of a spring 257, will bear against a stud 260 of the lever 206, preventing that lever from being moved to subtract position by movement of the shaft 205, even though a subtract operation has been called for by a carriage stop. A subtract operation is controlled by the carriage by its causing a rod 258 (Fig. 2) to be swung in a clockwise manner in its supporting bracket 259, which causes forward movement of a link 263, pivoted at its forward end to an arm 261 pivoted on a stud 262. The link 263 has a stud 264, which rides in a slot in a lever 265 pivoted to an arm 266 pivoted to the right end of the cross shaft 205 (see Fig. 3). As the link 263 (Fig. 2) moves forwardly, a shoulder on the lever 265 rides over an upper extending arm of a lever 267, pivoted on a pivot 268 and rocked through a roller 269 whenever the cam plate 113 operates in a machine operation. This will lift the lever 265 and, through a resilient spring connection by a spring 270 with the arm 204, secured to the shaft 205, will rock it in subtracting direction, setting up the pitmans 212 and 213 (Fig. 3) for a subtract movement of the totalizer. However, if the "Reverse" key 28 is depressed, this subtract movement is prevented, and the spring coupling between the arm 266 and the arm 204 (Fig. 2) permits this. This construction of the subtract-reverse key mechanism is more fully disclosed in United States Letters Patent No. 2,692,726, of Nelson R. Frieberg and Oscar F. Larsen, to which reference is made for more details of the construction, inasmuch as what has been described will give a full understanding of the invention disclosed in this application.

The carriage framework

Referring to Figs. 10, 11, and 14, the carriage is supported on a rail 281, secured to the upper rear edges of the vertical side frame plates 91 and 92. The left side carriage frame plate 282 and the right side frame plate 283 (Figs. 11 and 14) are joined, and braced by a rail 284 (see especially Fig. 10), which has on its rear edge rack teeth, by which the carriage may be returned to the right of the machine after tabulating to the left during a series of entry operations. Also extending between and forming a support for the side plates 282 and 283 is a rod 285. Referring to Figs. 11 and 14, the rails 281 and 284 have ball races, between which ball bearings are held, so that the carriage may move frictionlessly on the rail 284. The cross rod 285 is supported by an upper roller and by a lower roller, which are pivotally mounted on a bracket extending from the rail 281, in the center of the machine, it not being visible in Fig. 10, but being of old and well-known construction. This provides for an easy lateral movement of the carriage with respect to the machine. Referring to Fig. 10, there is secured to the carriage, by latch pieces 286, and 287, a stop bar 288, having pairs of grooves over which stops of the type shown in Figs. 24 and 32 may be clipped by forcing the arms of the stop into an associated pair of slots on the stop bar. These stops will be described in detail later, as to function.

The carriage tabulating mechanism

The carriage is urged to the left in the conventional way by a spring reel 295 (Figs. 10 and 14), mounted on a bracket on the support rail 281 and having wound around it a cord 296, attached to the right end of the carriage as viewed from the front of the machine, which, as the reel is on the left end of the carriage, tends constantly to pull the carriage toward the left. Extending over the stop bar 288 is a tabulating stop bar 297 (see Figs. 10, 17, and 24), mounted on a horizontal pin 298, so that the rear end may move up and down with relation to the stop bar and is urged toward it by a spring 299 (Fig. 17) but may be moved away from it in response to the urge of tabulating mechanism to be described. The pin 298 is supported in a bracket extending downwardly from the carriage support rail 281. The rear end of the tabulating stop bar is kept from actually striking the stop bar 288 by a roller 305 on a bracket 304 attached to the bar 297 and resting on a bail 307, to be described, so that the carriage may move unrestrictedly unless prevented by one of the stops. The rear end of the tabulating stop bar has a beveled surface 301, which allows free return of the carriage to the right over any stop except a terminal stop. A stop surface 302 is struck by the upper arm 303 of any of the intervening stops (see Fig. 32) to bring the carriage to a halt. If the rear end of the stop is lifted, the carriage will proceed to the left under the urge of the spring reel 295 until it comes to a terminal stop having a wide upper arm, like the arm 304 (Fig. 32), which is higher than the tabulating stop bar. The tabulating stop bar will be raised by the mechanism next to be described. The roller 305 extends over the tabulating release bail 307, pivotally mounted by right and left arms on the side plates 282 (Fig. 14) and 283 (Fig. 11). Referring to Fig. 11, the right end of the bail 307 extends through the right side of the carriage side frame plate 283 and over an arm 308 of the carriage release lever 50, which may be rocked counter-clockwise, as seen in Fig. 11, to raise the bail and withdraw the tabulating stop surface 302 from in front of whatever stop it may be positioned, allowing the carriage to move under control of the spring reel. A bell crank lever 310 (Fig. 17), pivoted on the machine proper, has a rearwardly-extending arm, projecting under an ear 306 of the bracket 304, and a downwardly-extending arm, having a rearwardly- and upwardly-projecting portion 311. On the rear drive shaft 95 is a cam arm 312, having on its upper end a stud (not seen in Fig. 17 because of mechanism in front of it) which strikes a by-pass pawl 313 pivoted on a stud on a bracket 314 secured to the back cross-brace of the machine. As the machine cycles, in the first half-cycle, the stud on the cam 312 by-passes the pawl 313, the latter rocking counter-clockwise around its pivot stud, as seen in Fig. 17, and on the return stroke the pawl is rocked clockwise, and a stud 315 thereon strikes the rear end of a lever 316, having a stud 317, which rides in a slot 318 in the bracket 314, pushing said lever rearwardly and forcing a stud 319 thereon to push rearwardly on the upwardly-extending portion 311 of the lever 310 and rocking it clockwise, which will operate on the ear 306 to raise the rear end of the tabulating stop bar 297 to free the carriage for movement by the spring reel to the next stop, the aforesaid parts immediately moving back to normal effective position as soon as the stud on the cam 312 has passed on by the by-pass pawl 313, near the end of a cycle of machine operation. As will be described in connection with the vertical feed mechanism, a link 320 is pulled to the left, as seen in Fig. 17, on operation of the vertical feed motor bar 27 (see Figs. 1 and 16 also). The link 320 has a slot-and-stud connection with a vertical feed blocking lever 321, pivoted to the machine frame and having a stud 322, which loosely passes through a hole in a bracket 323, attached to a link 324. The upper end of the link 324 is pivoted by the stud 319 to the lever 316, so that, when the vertical feed motor bar 27 is operated, the rear end of the lever 316 is pulled downwardly, rocking the forward end of said lever out of the path of the pawl 313, so that there will be no tabulation.

*Carriage return mechanism*

Referring to Fig. 25, if the carriage has tabulated against a "Return" stop, like the stop 330, which has a carriage return tappet 331 thereon (see Fig. 32 also), mechanism is set up whereby at the close of the subsequent machine operation the motor will be engaged with the carriage return rack by a mechanical coupling, and a switch will be closed to operate the motor, which will return the carriage to a right position, as determined by another stop, to be described. The tooth 331 strikes the top end of a lever 333 (see also Fig. 10) pivoted on a bracket secured to the rod 285, rocking said lever clockwise, as seen in Fig. 25, around its pivot 334. As seen in Fig. 25, the lower end of the lever 333 has a pin-and-slot coupling with a yoke 335 pivoted on a shaft 338 supported by and running forwardly from the framework of the machine. The lower extending arm of the yoke 335 is forked to receive a pin 336 of a yoke 337, pivoted on a shaft 329, rocking said yoke 337 counterclockwise on the shaft 239, as seen in Fig. 25. The yoke 337 has on its lowest extending arm an upwardly extending pin 339 engaging the lower forked end of a cam lever 340, pivoted at 341 to the machine frame. The upwardly-extending portion of the cam lever 340 has a bent-over camming portion 342, which extends over the top of a member 343, which has an upwardly-opening adjustment slot 344 and a bent-over end 345. The straight, rearwardly extending end 346 extends through a slot in a back supporting plate, not shown in Fig. 25 or in Fig. 29 (which is a reverse view of part of the mechanism of Fig. 25), because it would interfere with the showing of the mechanism. As seen in Fig. 29, the bent-over end 345 of the member 343 is held upwardly by a spring 347, so that its slot 344 engages a stud 348 on the upper end of a lever 349 pivoted at 350 to a frame-supported bracket (not shown). The lower end of the lever 349 has a ball-and-socket coupling with a bell crank lever 351, pivoted to a cross-brace 352. The lever 351 has a tappet formation 353, which, when the member 343 is pulled forward by a lever 354, is thereby moved to the position shown in Fig. 29, closing the normally open switch 81, to which reference has been made. The switch 81 is a switch that is open when the tappet 353 is pressed against its toggle mechanism in its normal, unoperated, condition. The formation 345 on the member 343 is engaged by the cam formation on a lever 354 (Fig. 25) on the main drive shaft 95, as a cycle of operation following the movement of the lever 333 comes to a close, moving the mechanism just described to close the switch 81. Referring back to Fig. 29, the lever 349 has a pin 355, which rides in the forked end of a yoke 356 on the shaft 95, which has pins 357 and 358 thereon, which engage a groove 359 (see Figs. 25 and 21) in a clutch member 360, slidably mounted on a shaft 361.

Referring to Fig. 21, which is an exploded view of the motor drive mechanism for carriage return operations, a shaft 362, extending from and driven by the motor, not shown, has pinned thereto a beveled gear 363, which is in mesh with a companion gear 364, pinned to a shaft 365. The shaft 361, supported in the end of the shaft 365, has secured thereto a disc 361a, which is driven by a first shock-absorbing spring 366, secured in a disc 365a. The rear end of the shaft 361 is supported in the hub of a clutch member 368, having radial corrugations 367, and is engaged on rearward movement of the clutch member 360, slidable by pin-and-slot coupling on the shaft 361 through the rocking of the yoke 356 (see Fig. 25). The rear surface of the clutch member 360 has corrugations 366a, which engage the corrugations 367, driving the clutch member 368 and a shaft 369, to which it is secured. A beveled gear 370 is mounted on the rear of the shaft 369 and has a limited rotational movement thereon by means of a pin-and-slot coupling 371a and a second shock-absorbing spring 371b, connecting the shaft 369 and the gear 370. The gear 370 engages a companion gear 371 on a shaft 372, coupled by a bayonet coupling 373 to a shaft 374, having a spur gear 375, which is in mesh with a gear 376, coupled by a shaft 377 to a gear 378. The gear 378 is in mesh with the carriage return rack 284, before mentioned. Ordinarily the parts 367 to 378 inclusive move freely with the rack when the machine tabulates, but, as the clutch members 360 and 368 engage, they are coupled to the motor, which, when started by the closing of the switch 81 (Fig. 29), causes the carriage to return to the right until stopped by mechanism which will be described.

As the carriage returns, under control of the carriage return mechanism, there has been provided means to raise the tabulating stop bar, so that the stops will not strike the beveled surface 301 (Fig. 17) of the tabulating stop bar, raising it each time a stop strikes it, to prevent a clicking noise as the carriage returns. On a ribbon feed link 379, pivoted to an arm 380, secured on the drive shaft 95, is welded a bracket 381, having rearwardly extending ears, on which a yoke 382 is pivotally mounted, said yoke having rearwardly-extending legs 383 and 384, the leg 384 having a shoulder 385 to cooperate with an ear 386 extending leftwardly from the downwardly-extending leg of the bell crank 310. The yoke is biased by a spring 388 to turn the yoke, so that the legs tend to move downwardly. Normally such movement is prevented by the upwardly-extending bent-over arm 389 of the yoke 337 (see Figs. 25 and 15), so that the shoulder 385 is not in the path of the ear 386 as the bell crank 310 is moved on operation of the machine. However, when the yoke 337 rocks on stop-controlled carriage return operations, the bent-over arm 389 of the yoke 337 lowers, and, as the machine operation commences by clockwise movement of the drive shaft 95, as seen in Fig. 17, the ribbon feed link rises, and the leg 384 is lowered and drawn backward, so as to catch the ear 386 of the bell crank 310 as it is rocked for tabulating movement. As the machine cycling action proper comes to a halt, the tabulating stop bar 297 will be held in ineffective position, so that the carriage is returned without any clicking action of the tabulating bar surface 301 over the stops. At the end of the return movement, of course, the yoke 337 returns to upright position, and the bell crank 310 will be unlatched and returned to home position.

Referring to Figs. 25 and 15, the shaft 329 has thereon, in back of the yoke 337, a lever 387 (Fig. 15), which has a normal position, as shown by the dotted line, where it has no effect on the leg 384 of the yoke 382. On vertical feed operations, where the link 320 is drawn to the left, as seen in Figs. 15 and 17, the lever 387 is rocked clockwise by a stud 390 to the position shown in full line in Fig. 15, where it is effective to hold the yoke 382 from latching the bell crank 310, so that, if the vertical motor bar is held down in an operation where the carriage is returned to the next stop, it will be held there by the tabulating stop bar.

*Automatic vertical feed*

Pivoted to the left carriage frame plate 282 (Fig. 14) by a pivot 400 is an arm 401, supporting the left end of a vertical feed bail 402 (see also Fig. 10). The right end of the feed bail 402 is supported by an arm 403 (Fig. 11), pivoted by a pivot 404 to the right carriage side plate 283. The bail is biased to swing clockwise around its pivots, as seen in Fig. 11, by reason of a spring 405, wound around the pivot 404 and hooking over the lower end of the arm 403, and by a similar spring 406 on the left side, as seen in Fig. 14. Pinned to a frame-supported member 399 is a yoke composed of members 407, 408, and 409 (Fig. 31), the member 408 having an ear embracing the top and outside edges of the member 407 and supporting a roller 410, mounted on a vertical stud. The member 407 has a forwardly- and upwardly-extending portion 411. The surface 412 of the yoke member 407 rests against a stud on an arm 430 on the rear drive shaft 95. When the machine is at rest, the roller 410, which constantly bears on the forward edge of the feed bail 402, keeps the feed bail rocked to its counterclockwise position, as shown in Fig. 11. As the machine operates, the shaft 95 moves the arm 430 and its stud away from the surface 412, and the bail rocks clockwise, as seen in Fig. 11, unless otherwise prevented. Referring to Fig. 31, the upper end of the arm 403 has pivoted thereto, at 414, a pawl 415, held rocked by a spring 417, so that its upper edge is held against a stud 416. The toothed end of the feed pawl 415, when the machine is in rest position, nearly engages a ratchet wheel 418 on the end of the paper platen support shaft 419 (see Fig. 11). As the machine commences operation and the feed bail 402 moves toward the rear casing of the machine, the pawl 415 is drawn rearwardly, and on the last half of the machine cycle the pawl moves forwardly, making contact with a tooth on the ratchet wheel 418 and moving the ratchet wheel and the platen, coupled thereto, in a vertical feeding direction. Pivoted on the platen support shaft 419 (Fig. 12), to which the ratchet wheel 418 is secured, is the vertical feed space control lever 54, having a downwardly-extending portion provided with a slot arcuate to the pivot point, the upper edge of the slot being notched to cooperate with a stud in a bell crank lever 391, pivoted to the platen's right support plate 392. The lower edge of the lever 391 (Fig. 12) has a camming surface 421. The lever may be moved to a clockwise position to hold the feed pawl 415 entirely away from the ratchet wheel 418, and it may be moved from there in a counter-clockwise direction to a "1" position, in which the cam surface 421 will hold the feed pawl 415 only partly away, so that the platen will be given one vertical spacing movement. In the full counter-clockwise, or "2," position of the lever 54, the camming surface 421 is ineffective on the pawl 415, and its movement in a machine operation spaces the ratchet wheel to give two vertical spacing movements. This vertical spacing movement, caused by the machine operation, is blocked in the event that the lever 34 (Fig. 1) is in the forward position, in which event the three-armed lever 422 (Fig. 23) is in its most counter-clockwise position, which lowers the links 423 and 424 to the position shown in Fig. 23. In this position, a guide stud 426 is in the upper end of a slot 427. Normally, there is positioned in front of the portion 411 of the member 407 (Fig. 31) an upwardly-extending arm 431 of a bell crank lever 321 pivoted to a cross member in the machine and held in the position shown by a spring 432 (see also Fig. 16) blocking the feeding movement of the vertical feed bail 402. The arm 431 of the bell crank lever 321 has a stud 428, riding in a slot 429 of the link 320, keeping the spring 432 from rocking the bell crank too far counter-clockwise, as seen in Fig. 16.

If the lever 34 is now placed in its middle position (Figs. 1 and 23), which is the "space-up" and "tabulating" position, the three-armed lever 422 will be caused to rock slightly clockwise, drawing up on the link 424, which leaves the stud 426 midway in the slot 427, and which will rock the cam plate 433 slightly counter-clockwise, as seen in Fig. 23. The cam plate 433 has a slot 435, in which rides a pin 436 in the left end of a lever 438. As seen from the rear, the cam 433 is urged clockwise by a spring 437 (Fig. 19) to hold it in contact with the link 424 (Fig. 23). This lever 438 is pivoted near its center by a pivot to a rear cross member of the machine, and said lever has at its right end (as seen in Fig. 19) a stud 440, which rides in an arcuate cam slot 441 in a camming lever 442, pivoted at 443 on the lower extending arm of the yoke 337. The right end of the lever 442 bears on the stud 322 of the bell crank lever 321.

When the lever 34 is in the forward, or "no space tabulating," position, as shown in Fig. 23—that is to say, set for a machine operation in which the platen does not feed vertically but does tabulate, the pin 436 rests in the rightmost part of the cam slot 435, as seen in Fig. 23, and the stud 440 (Fig. 19), on the other end of the lever 442, holds the lever 442, so that, upon the rocking of the yoke 337 as the return tappet 331 (Fig. 25) strikes the lever 333, the end 446 of the lever 442 (Fig. 19) will not bear down on the stud 322 to rock the vertical space bell crank 321 to unblocking position; therefore the platen is not spaced vertically on the machine operation, at the close of which the carriage is returned to the left, as has been described.

If, however, the lever 34 (Fig. 23) is in the middle position, the lever 438 is rocked clockwise slightly by the cam 433, so that, as the yoke 337 (Fig. 19) rocks as the tapept 331 strikes the lever 333, the right end 446 of the lever 442 rocks down, rocking the vertical space bell crank 321 to ineffective position, so that, on the machine operation at the end of which the carriage returns, the platen will vertically space.

If the lever 34 is in the rear position, as seen in Fig. 1, the bell crank 422 (Fig. 23) is in its most clockwise position, the stud 426 is in the bottom of the slot 427, and the lower end of the link 424 engages and lifts the left end 447 of a lever 448 (see Fig. 19) pivoted to a pivot 439, causing the right end 449 of said lever 448 to bear down on the stud 322, rocking the vertical feed bell crank 321 to ineffective position, so that the platen will space vertically on each machine operation. In addition, if a tappet 331 like that on the stop 330 (Fig. 25) attempts to rock the yoke 337 (Fig. 19), a stud 450 thereon, striking a surface 451 on a block 452 secured to the lever 448, prevents such rocking and thus prevents the return of the carriage.

To allow listing of entries—that is to say, vertical listing without automatic sub-total taking or total taking—in those columns where such function usually takes place, a normally-closed micro-switch 460 (Figs. 23, 27, and 28) in the solenoid supply circuit is opened by the action of the lower end of the link 424 rising and rocking a lever 462, pivoted on a frame-supported stud 463, clockwise, as seen in Fig. 23, the forward end acting on the lever 464 pivoted on a frame-supported stud 465 to actuate a switch button 466 to open the solenoid supply circuit.

*Manually-controlled vertical feed*

Referring to Fig. 16, the vertical feed motor bar 27 (see also Fig. 6), mounted in the bracket 198, may be depressed against the return action of a spring 467. The rearwardly-extending arm thereof has a by-pass pawl 468, pivoted thereto and extending downwardly therefrom. The by-pass pawl cannot rock counter-clockwise, as seen in Fig. 6, because of an ear 469. When the casing, on which the keys of Fig. 6 are supported, is in place on the machine, the by-pass pawl 468 is in the position shown when the machine is in rest position, as a spring 470 tends to rock it counter-clockwise, as seen in Fig. 6. A pawl 472 (Fig. 2), pivoted at 473 to a key release lever 473a, is held by a spring 474 in the shown position, with an ear resting on the lever 473a, against counter-clockwise movement, but is free to rock clockwise. The lower edge 475 (Fig. 6) of the pawl 468 rests on top of a roller 455 (Fig. 2), which, when pushed down, rocks its supporting arm 477 clockwise around its pivot on the trip lever 88, tripping the machine by the stud 477a bearing down on the arm 149, as has been described. Therefore, if the vertical feed motor bar 27 is given a temporary depression and is released before the end of a machine cycle, the machine goes through a one-cycle entry operation with vertical feed, caused by operation of the vertical feed bail 402 by means of the following described mechanism. Referring to Fig. 16, as the vertical feed motor bar 27 is depressed, a short rearwardly-extending arm 476 strikes a stud 477b on one arm of a three-armed lever 478, pivoted to the right side frame plate 91, rocking it clockwise before the edge 475 of the by-pass pawl 468 strikes the roller 455 to rock the arm 149 and set the machine operating. A latch piece in the form of a bell crank lever 479, pivoted to the frame plate 91, has a forked arm, in which rides a stud 480 on a middle arm 481 of the lever 478, and has an upwardly-extending arm 482, which is rocked counter-clockwise as the lever 478 rocks clockwise, catching the arm 482 back of an ear 483 on the arm 149 as the latter is rocked by the pawl 468. Thus, the lever 478 is held rocked clockwise until the close of a machine operation, when the trip lever 88 (see Fig. 2) is restored. As the lever 478 rocks clockwise, the link 484 is drawn forwardly. The rear end of the link 484 has a slot 485, by which it is supported on a frame-supported stud 486. A stud 487 extends leftwardly from the link 484 and is secured in a link 488, pivoted to a bell crank lever 490, pivoted on a frame-supported pivot 491. A rearwardly-extending arm of the lever 490 extends into a slot in a bell crank lever 492, pivoted on a frame-supported stud 493. An upwardly-extending arm of the lever 492 is pivoted to the link 320, coupled to the vertical feed bell crank lever 321 by pin-and-slot coupling. Through the described linkage, as the vertical feed motor bar 27 is depressed, the bell crank lever 321 will be rocked to ineffective position, so that the feed bail 402 will operate to vertically feed the platen on the ensuing machine operation. The parts will be restored to normal at the end of the machine cycle unless the vertical feed motor bar 27 is held down through the close of the said ensuing machine cycle.

As the links 484 and 488 move forwardly, the forward end of the link 488 rocks a bell crank lever 494, pivoted on a vertical frame-supported stud 495, clockwise pulling to the right a link 496, pivoted to the rearwardly-extending arm of the bell crank lever 494. The left end of the link 496 (Fig. 26) is pivoted to a lever 497, which is in turn pivoted to a lever 498. The levers 497 and 498 are resiliently coupled together by a spring 499. The rear end of the lever 498 is pivoted to a link 500, pivoted to the downwardly-extending arm of the yoke 337, pulling the yoke 337 in a carriage return movement. If the vertical feed motor bar 27 is released before engagement of the carriage return clutch, the vertical feed alone takes place. If the vertical feed motor bar 27 is held down until the carriage return clutch is engaged, the carriage will be returned one column, as will be described next.

*Vertical spacing and return of carriage by holding down vertical space key*

As has been described with reference to Fig. 15, as the link 320 is pulled in the direction of the arrow by operation of the vertical feed key, the lever 387 is rocked clockwise, as seen in Fig. 15, to move it from the dotted line position to the solid line position. The lever 387 is secured to the shaft 329, which, in turn, is coupled by a coupling 501 to the shaft 338, which is thus turned clockwise as seen in Fig. 15. Secured to the rear end of the shaft 338 is a cam member 502 (see also Fig. 10), which rocks an interponent 503 to the position shown in Fig. 15, where a stud 504 thereon is in the path of the hooked lower end of a lever 505, pivoted on the pivot stud 334. Ordinarily, the lever 505 is held in a home position by a spring 506 and is free to move resiliently on its pivot in either direction when hit by a tappet 507, placed on the lower arm of a carriage stop 508 (see also Fig. 32). This tappet controls the return of the carriage to a predetermined point when the vertical feed motor bar 27 is operated. In the set-up of stops on the stop bar 288, to bring about the program of posting operations described as preferred, the stop 508 stops the carriage in the date and folio columnar position. When the vertical feed motor bar 27 (Fig. 16) is depressed and held down through the end of an operation, the machine trip lever is permitted to move to untripped position at the conclusion of the machine operation, because, as the pawl 468 (Fig. 16) descends and strikes the roller 455, a stud 509 strikes against a surface 471 (Fig. 2) of the pawl 472, rocking the pawl 468 (Fig. 16) off of the roller 455 (Fig. 2), so that the trip lever 88 can move to home position unimpeded. Returning to Fig. 15, the interponent 503 is pivoted to an upwardly- and rearwardly-extending arm 510 of a yoke 511, rockably mounted on the shaft 338. An ear 512 on the arm 510 extends up and behind the rearwardly- and upwardly-extending arm of the yoke 335. When, near the end of the machine cycle in which the vertical feed motor bar 27 is being held down, the cam 354 (Fig. 25) operates the member 346, the yoke 356, and the switch 81 (see also Fig. 29), the carriage commences its return movement. As the stop 508 (Fig. 15) approaches the lever 505, the tappet 507 strikes its top end, rocking it counter-clockwise. As the stud 504 now is in the path of the lower end of the lever 505, the yoke 335 is returned to home position, carrying the yoke 337 to home position, which disengages the carriage return clutch. At the time the yoke 337 moves to home position, a link 453 (Figs. 19 and 29) is pulled to the right, as seen in Fig. 29, rocking the bell crank 351 to home position, which opens the motor switch 81. The resilient coupling between the levers 497 and 498 (Fig. 26) permits the just-described return of the yoke 337 to home position, even though the operator has not yet released the vertical feed motor bar 27.

*The front-feed paper-holding mechanism*

Referring to Figs. 11 and 14, the platen shaft 419 is journaled in a right platen support plate 392 (Fig. 11), before mentioned, and a left platen support plate 520 (Fig. 14). The plates 392 and 520 are pinned to a cross shaft 521, journaled in and extending between the vertical carriage end plates 282 and 283. A cross shaft 523, extending between and supporting the plates 392 and 520, has rockably secured thereto the paper table 40, before mentioned in connection with Fig. 1, for supporting record material to be inserted between it and the rear of the platen and to be wound around the platen and up in front of the printer, as is the "Journal" sheet appearing in Fig. 1.

The platen-carrying assembly is constantly urged to rock clockwise around the shaft 521, as before explained, as seen in Fig. 11, by springs 524 and 525 (see also Fig. 14) stretched between the said plates 392 and 520 and the plates 282 and 283, and will rock clockwise until the surface 526 on the plate 392 strikes a stop 527 and a surface 528 on the plate 520 strikes a stop 529, unless otherwise restrained.

Referring to Fig. 20, a carriage-latch-operating bail 530 extends between the carriage side plates 282 and 283 and is supported by arms pivoted to said plates, the left arm 531 and the pivot 532 being shown in Fig. 20. The right end, not shown, is supported in a similar manner. The upper end of the arm 531 has a bent-over ear 533, adapted to engage a shoulder 534 on a latch plate 535 mounted on the inside of plate 520. A spring 536 and a corresponding one on the right end tend to swing the bail 530 in a latching direction. The thumb lever 46, pivoted on the pivot 532, has an upwardly-extending ear 537, which bears against a stud 538, secured in the upper end of the arm 531 and extending through a clearance slot in the plate 520. By rocking the platen-supporting assembly against the action of the springs 524 and 525 by a forward pull on the top of the paper table 40, the platen assembly is latched in its closed position, with the platen in printing position. Rearward movement of the top of the lever 46 will unlatch the platen supporting assembly, and, upon its clockwise movement, as seen in Fig. 11, the platen will move upwardly and rearwardly. Opening of the carriage automatically by bail 530 will be discussed in the next section.

The transparent plate 43 (Fig. 1) is held in a frame 542, pivoted to the carriage frame plate 282 on a forwardly and upwardly extending portion 540 (Fig. 14) and to the carriage frame plate 283 (Fig. 11) on a similar forwardly and upwardly extending portion 541. The frame 542 is coupled at either end to the platen supporting side plates 392 and 520 by stud-and-slot couplings of conventional construction, so that, as the platen assembly is rocked to open position, the frame 542 flops open, top toward the front, so that record material can be passed, from the front, under the platen and out the rear on a paper table 543 (Fig. 10).

On the bottom edge of the paper table 40 is a series of pressure rolls 544 supported on a shaft 545 supported by said table 40 at 546 and 547. The bottom edge of the table 40 and consequently the rolls 544 are normally held against the platen, so as to grip paper fed around the platen from the rear. The pressure rolls are pressed against the platen by a bar 548, pivoted in the platen support side plates 392 and 520, which has spring fingers extending downwardly and resting against the lower edge of the table 40. The bar 548 is spring-urged to force the fingers against the paper table to keep the pressure rolls 544 against the platen or against the paper fed in from the rear. Rearward movement of the lever 47 (Fig. 1) releases these pressure rolls by rocking of the bar 548. The lever 47 also rocks the back paper bail 48 (Fig. 1) secured to an arm at either end, like the arms 549 and 550 (Fig. 10), the arm 549 also being shown in Fig. 1, these arms being pivoted at their rear ends to the platen support side plates 392 and 520. The arms are joined by a rod 551 (Fig. 10) behind the paper table 40. The lever 47, when moved rearwardly, operates on the rod 551 in conventional manner and lifts the paper bail. The lever 47 is held in operated condition in either one of two extents of movement by spring detent means of well-known construction. As has been said, the rear pressure rolls are released in the second, or full, extent of rearward movement, so that the rear-fed paper can be alined.

The rear rockable paper table 543 (Fig. 10), which supports front-fed record material, is pivoted to the shaft 521 (see Figs. 11 and 14) and has a portion extending under the platen in a forward direction. The front edge of the paper table 543 has curved fingers extending up and around the platen, and the fingers are joined at their ends by the pressure plate 42 (Fig. 1), which, when the carriage is closed, is held against the platen or against paper held around the platen, so that the paper is in proper contact with the platen for printing and tabulation. Front pressure rollers, not shown, extend between the curved fingers, so as to hold the front-fed paper against the platen for vertical feed when the carriage is closed. The rockable paper table is heavier in the front end than in the rear end, and, when the platen rocks upwardly and backwardly and the transparent plate 43 flops open forwardly, the plate 42 on the front end of the paper table 543 is let down, forming a chute between it and the platen, so that paper may be fed into the chute. The carriage then is closed on it.

Automatic carriage opening

From what has been said, it will be apparent that the rocking of the bail 530 (Fig. 20) in the direction of the arrow 583 will unlatch the platen assembly, so that it will rock in response to the urge of the springs 524 and 525 (Figs. 11 and 14), throwing the platen upwardly and rearwardly, so that paper may be front-fed under the platen onto the rear paper table.

Mechanical means, actuated by carriage movement, has been provided, operable in either direction of carriage movement, or only in one direction of carriage movement, according to the selected controls and their placement on the stop bar, to open the carriage as it is moving.

Figure 32:
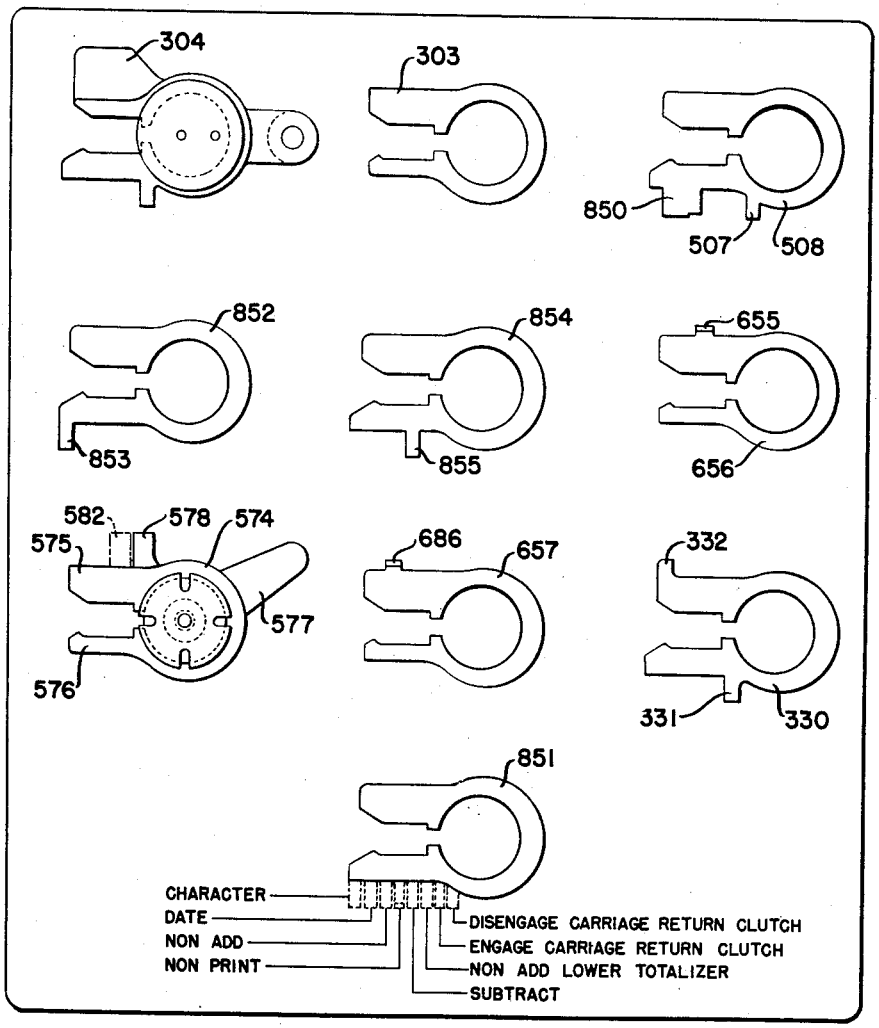
Fig. 32 is a chart of the profile of the stops used in the preferred embodiment.

Pivotally supported on a pin 560, running crosswise of the machine and through a supporting member of the machine framework, is a yoke consisting of arms 561 and 562 joined at the rear end by a plate 563. The lower edges of the arms 561 and 562 have feet 564 and 565, respectively, when rest on a frame-supported rest 566, against which they are urged by a spring 567. The front edges of the arms 561 and 562 rest against the bail 530. On the plate 563 is pivoted, at 569, a by-pass cam pawl 568. Pivoted at 570 is a similar pawl 571. The pawl 571 is spaced rearwardly from the pawl 568, so that a tappet formation on a carriage-opening stop that is in line with the pawl 568 would not be in line with the pawl 571, and vice versa. An abutment 572 projects rearwardly from the plate 563, and a spring 573 holds the pawls 568 and 571 against the abutment. In the preferred embodiment of the machine as set up in accordance with the record material shown in Fig. 1, the carriage is opened just after starting its return movement, and this is brought about by use of a carriage-opening control member 574 (see Figs. 10, 20, and 32). The member 574 has an upper arm 575 and a lower arm 576 (Fig. 32) for being clipped onto the stop bar 288 in the usual manner, and has pivoted thereto a lever 577, having a tappet formation 578, which, when positioned, as shown in Fig. 32 and clipped on the stop bar 288 (Fig. 20), is in line with the by-pass cam pawl 571. As the carriage is tabulating in the direction of the arrow 579, the tappet 578 rocks the by-pass cam pawl 571 counter-clockwise, as seen in Fig. 20, with no effect. However, on carriage return, which is in the direction of the arrow 580, the tappet formation 578 strikes the sloping surface 581 of the pawl 571, rocking the bail 530 in the direction of the arrow 583, unlatching the platen-carrying assembly, which rocks to open position. This carriage opening occurs while the carriage is in motion. The control member 574 preferably is placed as shown, so that the carriage starts opening at the commencement of carriage return. Referring to Fig. 32, if the lever 577 is rotated clockwise, the stop formation 578 is moved away out of alinement with the by-pass cam pawl 571, and the automatic carriage opening will not occur.

The carriage may be made to open on tabulating movement thereof—that is, in the direction of the arrow 579—by providing a carriage opening tappet formation 582, as seen in dotted lines in Fig. 32, on the lever 577 instead of the tappet formation 578. The formation 582 will cooperate with the by-pass cam pawl 568, by-passing it on carriage return and camming it up on carriage tabulation.

Vertical feed of platen on carriage opening

Referring to Figs. 11 and 13, a ratchet pawl 590 is pivoted at 591 to the right carriage frame plate 283. The pawl has a ratchet tooth 592, adapted to cooperate with the teeth on the beforementioned ratchet wheel 418 on the platen shaft 419, which, as has been explained, is supported on its right end in the plate 392. When the carriage opens, the tooth 592 moves relatively to the ratchet wheel 418 but normally is kept from contact therewith, because, even though a spring 593 urges the tooth 592 into engagement with the ratchet wheel, it cannot make such movement, as a stud 594 on the pawl 590 strikes the rear edge of the lever 61, which normally is in "0" position (see Fig. 13). The lever 61 is pivoted at 595 on the platen support side plate 392. If the lever 61 is moved to the "1" position, the tooth 592 approaches and engages the ratchet wheel 418, so that, on the opening of the carriage, the platen is moved one step. When the lever is moved to the "2" position, the tooth 592 is permitted to move closer, so that when the carriage opens, the platen will be given two steps of movement. These vertical feed movements are supplementary to the vertical movement of the platen given by machine operation.

*Automatic cut-off of main motor supply circuit when carriage is opened*

A switch 600 (Figs. 9 and 22), which normally is closed, is provided in the main motor supply circuit, which circuit is closed by the switch 89 to start a machine operation. This switch 600 is secured to the rear vertical cross brace 601 of the machine. The switch has, resting on its operating button 602, a plunger 603, which, when pushed down, opens the switch 600. The plunger 603 is held alined vertically by passing through holes in brackets 604 and 605 secured to the brace 601. A spring in the switch holds the button up, carrying the plunger with it. Pivoted to the bracket 606 is a collar 607, which collar has a roller on a radial stud 608, which lies in back of the carriage-opening bail 530. Secured to the side of the collar 607 is an ear 609, resting on top of the plunger 603. As the bail moves in the direction of the arrow, collar 607 is rocked, so that the ear 609 bears down on the plunger 603, breaking the motor circuit when the carriage is opened.

*Automatic means for locking the machine trip lever when the carriage is not on a stop*

In order to prevent the machine from being tripped to initiate a machine operation when the carriage is not on a stop, mechanical means is provided to latch the trip lever 86 (see Figs. 7 and 18) against movement from home position by the trip lever 88 (Fig. 2). Pivoted in a hole 610 (Figs. 17 and 18), on the rear end of the tabulating stop bar 297, by a pivot 611, is a member 612, having a slanting cam edge 613a. The member 612 is raised upwardly on return movement of the carriage as the tabulating stop bar 297 rocks upwardly. However, on tabulating movement of the carriage, the member 612 is rocked on its pivot when its edge 613a is struck by the forward end of the upper leg of any stop shown in Fig. 32. Fig. 18 shows a stop about to rock the member 612. The downwardly-extending leg of the member 612 strikes the arm 613 of a link 614, slidably mounted, by a stud-and-slot coupling, to the machine framework, moving the link 614 forwardly to rock a lever 615 counter-clockwise around its supporting stud 616. The lower end of the lever 615 has a stud 617, bearing against the upper end of a bell crank lever 618, pivoted to the framework at 619a. The forward end of the lever 618 has a hook 619, which normally engages the machine trip lever 86 (also see Fig. 7). When a stop rocks the member 612, the hook 619 is raised against the action of a spring 620, permitting the machine to be tripped. Thus, the machine cannot be tripped when the carriage is between stops.

*Automatic total taking and sub-total taking*

Secured to a cross frame member 625 (Fig. 7) are a sub-total solenoid 626 and a total solenoid 627 (see Figs. 27 and 30) supplied with operating current through the main common switch 55 (Fig. 28), common switch 460, beforementioned in connection with Fig. 23, and switch 629 individual to solenoid 626 and switch 630 individual to solenoid 627. Operation of solenoid 626 pulls in on a core 632 (Fig. 30), which pulls forwardly on link 634 to turn yoke 635, which is loosely mounted on a shaft 633. The left end of yoke 635, as seen in Fig. 30, is coupled to a wire link 637 coupled at the other end to one end of a lever 638 mounted on a frame-supported stud 638a. The upper end of lever 638 is connected to a link 237, the upper end of which is connected to sub-total slide 231. Operation of solenoid 626, therefore, will set the machine into a sub-total operation. Switch 629 has an operating button 629a, which, when pushed in by the rocking of a yoke 644 having on its right end, as seen in Fig. 24, a downwardly-extending lever 642, the lower end of which is in contact with button 629a, closes the switch 629 to operate the sub-total-taking solenoid 626. Yoke 644 is loosely mounted on cross shaft 643 and has depending from its left end, as seen in Fig. 24, a lever 647 with a bent-over end which makes contact with a bent-over end of a lever 649 pivoted on pivot 650. The rear end 651 of lever 649 has a bent-over ear 652 in contact with one arm of by-pass pawl 653, the other arm of the by-pass pawl being in the path of movement of tappet 655 of stop 656 (Fig. 32 also), said by-pass pawl being rocked ineffectively as the carriage is in return movement by said pawl but, when the carriage is in tabulating movement, rocking parts 652, 651, 649, 648, 647, 644, and 642 to close switch 629 to institute an automatic sub-total operation.

When total solenoid 627 is supplied with operating energy through closing of switch 630 (Fig. 28), presuming that the main switch 55 and the switch 460 are closed, the total slide 231a will be pulled down through link 663, shaft 633, link 636, wire 666, offset lever 667, and link 233.

Total switch 630 (see also Fig. 24) has an operating button 641 adapted to be pressed in to close the switch by operation of a lever 662 secured to one end of cross shaft 643, the other end of which is secured to a depending arm 680 operated by stop-operated total bell crank lever 682 pivoted on pivot 650, so that, if the bent-over left end 683 of bell crank lever 682 is struck by means next to be described, the machine will take a total automatically. A by-pass pawl 659, operating in a manner similar to that of by-pass pawl 653 but in a different plane, may be rocked by a tappet 686 on a stop 657 (see Fig. 32) on tabulating movement of the carriage, to strike lever 682 to set the machine into an automatic total operation.

*Means for preventing tripping of the machine while the carriage is returning*

Referring to Fig. 29, the rearwardly-extending arm 890 of the three-armed lever 97 (see also Fig. 8) has a bent-over ear 891, by which it is caught in ineffective home position by the latch piece 85, as shown in Fig. 8. Ordinarily, the latch piece 85 is rocked to non-latching position by the end of the lever 86 when the machine is tripped manually, allowing the lever 97 to rock in response to the urge of the spring 98, setting the machine in operation. To prevent such, during carriage return operations, an upright member 892 is attached to the lever 351. The upper end of the member 892 has a notch 893, which, when the lever 351 is in the carriage return position, is positioned under the ear 891 (see Fig. 8), preventing the lever 97 from rocking even though the latch piece 85 has been rocked to ineffective position. Thus, operation of the machine is prevented during carriage return.

*Machine operation*

As the carriage is returned, the tabulating stop bar strikes the formation 304 (Figs. 10 and 32) on the terminal stop. The carriage is open, and the journal sheet is in place. The operator then sets up the old balance of the account in question, after inserting, from the front, the ledger card and the customer's statement, and closing the carriage. The add motor bar 26 is depressed, entering the amount additively into both totalizers, after which the machine tabulates to the date and reference column, where it is stopped by the stop 508, having, in addition to the carriage return clutch disengaging tappet 507, before mentioned, the formation 850, which controls the machine according to the functions noted on the sample stop 851 (Fig. 32). The machine functions of printing controls and totalizer-engaging controls will not be gone into further than has been set forth, as the constructions are old and do not bear on the invention herein. Reference is made to the aforementioned Frieberg and Larsen Patent No. 2,692,726 for such further disclosure. The machine is set in operation, printing the date and the folio, and the carriage tabulates to a stop 852, which has a tappet formation 853, which enables the character-printing hammer. The amount of the transaction is entered through the use of the digit keyboard and the add motor bar 26. The machine may be operated by the vertical feed motor bar 27 if there is more than one item in the transaction, and may be held down if a carriage return to the date and folio column is required. Tabulation from the charge column to the credit column is against a stop 854, which has a subtract tappet formation 855, conditioning the machine to automatically subtract an item set up on the digit keys unless the reverse key 28 (Fig. 1) is first operated. The machine next tabulates to the stop 656, which has the sub-total control 655, setting the machine into a two-cycle sub-total-taking operation. During the first of the two cycles, the tabulating mechanism tabulates the machine to the plain stop 303, where the sub-total of the upper totalizer is printed. Then, the carriage tabulates to the stop 856, where, like the stop 854, there is a subtract stop. Here the old balance is again set up and subtracted from both totalizers by use of the add motor bar 26. The carriage then tabulates by the carriage-opening control member 574 and against the total-taking stop 657 and, before the second cycle of the total-taking operation, tabulates to the carriage return stop 330. After the total is printed, the carriage is returned and, while returning, is opened, so that the ledger sheet and the customer's statement may be removed. As the carriage opens, the journal sheet is spaced upwardly according to the setting of the lever 61 (Fig. 1).

While the form of the mechanism shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. In a calculating machine, the combination of a main operating means; a cycle control means including an electric motor, an electric supply circuit for the motor, and a cycle control trip means operable to initiate a cycle of machine operation by coupling the motor to the electric supply circuit and to the main operating means; a printer; a record material carriage shiftable laterally with respect to the printer; a cylindrical record-material-holding platen, rockably supported on the carriage so it may be rocked toward the printer to a printing position and rocked away from the printer for record material insertion; means constantly urging the carriage in a tabulating shifting direction; gear means operable for returning the carriage in a direction opposite the tabulating direction; carriage return means operable to connect the gear means to the motor; a second electric supply circuit for the motor, which circuit is normally operated by switch means operated by the operation of the carriage return means to connect the motor to said second electric supply circuit so the motor through the gear means starts the return of the carriage; carriage return control means which, when rendered effective, causes the main operating means to move the carriage return means to operated condition at the end of a machine cycle; machine-operated vertical feed means operable each machine operation, but subject to be blocked, to rotate the platen a selected amount each machine operation, to feed the platen-held record material vertically; blocking means normally disabling the machine-operated vertical feed means, said blocking means being movable to an ineffective position; stops selectively set on the carriage to control the stopping of the carriage in tabulating direction at various selected columnar positions, at least one of the stops having a carriage return operating tappet formation for moving the carriage return control means to effective position, at least another stop having a normalizing tappet formation for controlling the carriage return control means and carriage return means to move to unoperated condition, and one or more intermediate stops, each having a partial return tappet formation for returning an associated carriage control means and carriage return means to unoperated condition; tabulating means normally effective during a machine cycle to allow the carriage to move to the next stop, said tabulating means being subject to be moved to ineffective condition; a carriage return lever in the path of movement of the carriage return tappet and the normalizing tappet and moved by tabulating movement of the carriage, when the carriage return tappet strikes it to render the carriage return control means operable, said carriage return control means being allowed to move to unoperated condition when the normalizing tappet is struck by the carriage return lever on full return movement of the carriage; a normally free swinging lever in the path of movement of the partial return tappet; and a vertical feed motor bar which, when operated, disables the tabulating means, moves the blocking means for the vertical feed means to ineffective position, operates the cycle-initiating trip means to initiate a machine cycle in which the platen is vertically spaced, introduces an interponent between the free swinging lever and the carriage return control means, and renders the carriage return control means effective, so that during the machine operation the platen is vertically spaced and so that if at the conclusion of the machine operation the vertical feed motor bar is still in operated condition, the carriage will be returned until a partial return tappet strikes the normally free swinging lever which, through the interponent connection, renders the carriage return means inoperative, thereby stopping the return movement of the carriage at the stop having the partial return tappet.

2. The machine of claim 1 in which there is provided a spacing and tabulating control lever means movable by the operator to any one of three positions, the control means in a first one of the positions being ineffective to control the normally effective tabulating means and ineffective to move the vertical feed blocking means to ineffective position, in a second one of the positions holding the vertical feed blocking means in ineffective position but being ineffective to control the normally effective tabulating means, and in the third one of the position but being ineffective to control the normally ineffective position and disabling the tabulating means.

No references cited.

UNITED STATES PATENT OFFICE
CERTIFICATE OF CORRECTION

Patent No. 2,923,394                                              February 2, 1960

Nelson R. Frieberg et al.

It is hereby certified that error appears in the printed specification of the above numbered patent requiring correction and that the said Letters Patent should read as corrected below.

Column 2, line 32, for "postion" read -- position --; column 5, line 74, for "regarless" read -- regardless --; column 6, line 13, for "vertcial" read -- vertical --; column 7, line 58, for "repeated" read -- printed --; column 13, line 50, for "sidef rame" read -- side frame --; line 51, for "c n 210" read -- cam 210 --; column 19, line 47, for "is most" read -- its most --; column 20, line 20, for "tapept" read -- tappet --; column 24, line 10, for "when" read -- which --; column 28, line 61, for "position but being ineffective to control the normally" read -- positions holding the vertical feed blocking means in --.

Signed and sealed this 2nd day of August 1960.

(SEAL)
Attest:

KARL H. AXLINE
Attesting Officer

ROBERT C. WATSON
Commissioner of Patents